(12) United States Patent
Mitchell et al.

(10) Patent No.: US 11,761,823 B2
(45) Date of Patent: Sep. 19, 2023

(54) TEMPERATURE SENSOR ISOLATION IN SMART-HOME DEVICES

(71) Applicant: Google LLC, Mountain View, CA (US)

(72) Inventors: Michael Mitchell, San Francisco, CA (US); Arun Raghupathy, Pleasanton, CA (US); William Dong, Redwood City, CA (US); Adrian Shanov, Mountain View, CA (US)

(73) Assignee: Google LLC, Mountain View, CA (US)

( * ) Notice: Subject to any disclaimer, the term of this patent is extended or adjusted under 35 U.S.C. 154(b) by 426 days.

(21) Appl. No.: 17/006,472

(22) Filed: Aug. 28, 2020

(65) Prior Publication Data

US 2022/0065704 A1 Mar. 3, 2022

(51) Int. Cl.
*G01K 1/16* (2006.01)
*G01K 13/024* (2021.01)
*G05D 23/19* (2006.01)
*G01K 13/02* (2021.01)

(52) U.S. Cl.
CPC .............. *G01K 1/16* (2013.01); *G01K 13/02* (2013.01); *G05D 23/1917* (2013.01); *G01K 13/024* (2021.01)

(58) Field of Classification Search
CPC ........ G01K 1/16; G01K 13/02; G01K 13/024; G05D 23/1917
See application file for complete search history.

(56) References Cited

U.S. PATENT DOCUMENTS

| 3,991,357 | A | * | 11/1976 | Kaminski | H02J 7/1476 290/37 R |
| 4,183,290 | A | * | 1/1980 | Kucharczyk | F24F 13/24 454/906 |
| 4,223,831 | A | * | 9/1980 | Szarka | G05D 23/1902 236/1 R |
| 4,335,847 | A | * | 6/1982 | Levine | F23N 5/203 165/238 |
| 4,408,711 | A | * | 10/1983 | Levine | G05D 23/20 236/11 |

(Continued)

FOREIGN PATENT DOCUMENTS

| CA | 2202008 C | 2/2000 |
| EP | 0196069 B1 | 12/1991 |

(Continued)

OTHER PUBLICATIONS

International Search Report and Written Opinion for PCT/US2021/047465 dated Jan. 14, 2022, all pages.

(Continued)

*Primary Examiner* — Nathaniel T Woodward
*Assistant Examiner* — Philip L Cotey
(74) *Attorney, Agent, or Firm* — Kilpatrick Townsend & Stockton LLP

(57) ABSTRACT

A smart-home device may include a housing, a printed circuit board (PCB) inside the housing, an environmental sensor mounted to the PCB inside the housing, and a gasket that encloses the environmental sensor inside the housing to isolate the environmental sensor from an atmosphere inside of the housing while allowing an atmosphere outside of the housing to enter the gasket such that the environmental sensor can measure an aspect of the atmosphere outside of the housing.

19 Claims, 13 Drawing Sheets

(56) References Cited

U.S. PATENT DOCUMENTS

| | | | | |
|---|---|---|---|---|
| 4,615,380 A * | 10/1986 | Beckey | G05D 23/1904 | 236/78 D |
| 4,674,027 A * | 6/1987 | Beckey | G05D 23/1904 | 700/35 |
| 4,685,614 A * | 8/1987 | Levine | G05D 23/1904 | 236/78 D |
| 4,751,961 A * | 6/1988 | Levine | G05D 23/1904 | 165/265 |
| 4,897,798 A * | 1/1990 | Cler | F24F 11/52 | 165/239 |
| 4,971,136 A * | 11/1990 | Mathur | H02J 3/14 | 165/262 |
| 5,022,766 A * | 6/1991 | Phipps | G01K 1/14 | 374/163 |
| 5,088,645 A * | 2/1992 | Bell | F24F 11/46 | 236/47 |
| 5,199,637 A * | 4/1993 | Adams | G05D 23/1917 | 361/140 |
| 5,211,332 A * | 5/1993 | Adams | G05D 23/1917 | 236/78 D |
| 5,240,178 A * | 8/1993 | Dewolf | G05D 23/1917 | 236/78 D |
| 5,244,146 A * | 9/1993 | Jefferson | G05D 23/1909 | 236/46 F |
| 5,395,042 A * | 3/1995 | Riley | F24F 11/88 | 236/47 |
| 5,476,221 A * | 12/1995 | Seymour | F24F 11/46 | 236/47 |
| 5,499,196 A * | 3/1996 | Pacheco | G08B 26/008 | 702/81 |
| 5,555,927 A * | 9/1996 | Shah | G05D 23/1904 | 165/239 |
| 5,611,484 A * | 3/1997 | Uhrich | G05D 23/1935 | 236/78 B |
| 5,808,294 A * | 9/1998 | Neumann | H05B 47/11 | 315/159 |
| 5,902,183 A * | 5/1999 | D'Souza | F24F 11/30 | 454/258 |
| 5,909,378 A * | 6/1999 | De Milleville | G05D 23/1904 | 236/47 |
| 5,918,474 A * | 7/1999 | Khanpara | F25B 49/027 | 62/183 |
| 5,977,964 A * | 11/1999 | Williams | H04N 7/10 | 348/E17.005 |
| 6,062,482 A * | 5/2000 | Gauthier | G05D 23/1919 | 236/78 D |
| 6,066,843 A * | 5/2000 | Scheremeta | F24F 11/88 | 250/214 AL |
| 6,072,784 A * | 6/2000 | Agrawal | H04W 52/28 | 370/335 |
| 6,095,427 A * | 8/2000 | Hoium | B60H 1/3232 | 236/46 F |
| 6,098,893 A * | 8/2000 | Berglund | G05D 23/1917 | 236/51 |
| 6,213,404 B1 * | 4/2001 | Dushane | F24D 19/10 | 236/94 |
| 6,216,956 B1 * | 4/2001 | Ehlers | F24F 11/62 | 236/47 |
| 6,347,747 B1 * | 2/2002 | Nesbitt | G05D 23/1902 | 337/380 |
| 6,349,883 B1 * | 2/2002 | Simmons | F24F 11/62 | 236/51 |
| 6,356,204 B1 * | 3/2002 | Guindi | G01V 1/008 | 73/659 |
| 6,370,894 B1 * | 4/2002 | Thompson | F24F 11/62 | 62/158 |
| 6,415,205 B1 * | 7/2002 | Myron | G06K 9/6293 | 700/275 |
| 6,478,233 B1 * | 11/2002 | Shah | G05D 23/1904 | 236/94 |
| 6,645,066 B2 * | 11/2003 | Gutta | F24F 11/74 | 454/229 |
| 6,769,482 B2 * | 8/2004 | Wagner | F24F 11/61 | 165/238 |
| 6,990,821 B2 * | 1/2006 | Singh | G05B 23/0245 | 236/94 |
| 7,024,336 B2 * | 4/2006 | Salsbury | F24F 11/30 | 702/182 |
| 7,149,727 B1 * | 12/2006 | Nicholls | G01D 4/004 | 705/412 |
| 7,149,729 B2 * | 12/2006 | Kaasten | G06F 16/192 | 707/999.102 |
| 7,188,482 B2 * | 3/2007 | Sadegh | F24F 11/39 | 236/94 |
| 7,287,709 B2 * | 10/2007 | Proffitt | G09G 3/3406 | 236/94 |
| 7,379,791 B2 * | 5/2008 | Tamarkin | G01D 4/004 | 700/286 |
| RE40,437 E * | 7/2008 | Rosen | F24F 11/30 | 236/1 C |
| 7,469,550 B2 * | 12/2008 | Chapman, Jr. | F24F 11/46 | 62/331 |
| 7,644,869 B2 * | 1/2010 | Hoglund | G05D 23/1902 | 236/46 C |
| 7,702,424 B2 * | 4/2010 | Cannon | H04L 12/10 | 700/24 |
| 7,784,704 B2 * | 8/2010 | Harter | F24F 11/61 | 236/1 C |
| 7,802,618 B2 * | 9/2010 | Simon | G05D 23/1934 | 236/1 C |
| 7,848,900 B2 * | 12/2010 | Steinberg | F24F 11/58 | 702/182 |
| 7,849,698 B2 * | 12/2010 | Harrod | F25B 49/02 | 236/94 |
| 7,854,389 B2 * | 12/2010 | Ahmed | F24F 11/63 | 236/44 C |
| 8,010,237 B2 * | 8/2011 | Cheung | G05B 19/048 | 165/238 |
| 8,019,567 B2 * | 9/2011 | Steinberg | G01M 99/005 | 165/238 |
| 8,037,022 B2 * | 10/2011 | Rahman | G06F 16/40 | 707/613 |
| 8,090,477 B1 * | 1/2012 | Steinberg | G05D 23/1905 | 700/278 |
| 8,091,375 B2 * | 1/2012 | Crawford | F24F 11/0008 | 62/176.1 |
| 8,131,497 B2 * | 3/2012 | Steinberg | G05B 19/048 | 702/182 |
| 8,174,381 B2 * | 5/2012 | Imes | H04L 43/08 | 700/13 |
| 8,180,492 B2 * | 5/2012 | Steinberg | G05D 23/00 | 236/46 R |
| 8,219,249 B2 * | 7/2012 | Harrod | G05B 19/042 | 62/155 |
| 8,558,179 B2 * | 10/2013 | Filson | F24F 11/30 | 236/1 C |
| 9,016,593 B2 * | 4/2015 | Metselaar | G05D 23/1902 | 236/94 |
| 9,127,853 B2 * | 9/2015 | Filson | G05D 23/27 | |
| 9,360,229 B2 * | 6/2016 | Modi | F24F 11/88 | |
| 10,209,688 B2 * | 2/2019 | Stefanski | G05B 15/02 | |
| 10,557,640 B2 * | 2/2020 | Warren | G01R 19/16533 | |
| 2004/0249479 A1 * | 12/2004 | Shorrock | F24F 11/52 | 700/83 |
| 2005/0090915 A1 * | 4/2005 | Geiwitz | G05B 15/02 | 700/275 |
| 2005/0128067 A1 * | 6/2005 | Zakrewski | G08B 29/20 | 340/511 |
| 2005/0150968 A1 * | 7/2005 | Shearer | G05D 23/1902 | 236/94 |
| 2005/0189429 A1 * | 9/2005 | Breeden | F24F 11/67 | 236/46 R |
| 2005/0192915 A1 * | 9/2005 | Ahmed | G06N 3/02 | 706/21 |
| 2005/0280421 A1 * | 12/2005 | Yomoda | G01V 1/008 | 324/350 |
| 2006/0186214 A1 * | 8/2006 | Simon | F24F 11/523 | 236/1 C |

(56) References Cited

U.S. PATENT DOCUMENTS

| | | | | |
|---|---|---|---|---|
| 2006/0196953 A1* | 9/2006 | Simon | | F24D 19/1096 236/46 R |
| 2007/0045431 A1* | 3/2007 | Chapman | | F24F 11/30 236/1 C |
| 2007/0115902 A1* | 5/2007 | Shamoon | | H04M 3/42 370/338 |
| 2007/0205297 A1* | 9/2007 | Finkam | | F24F 11/30 236/1 C |
| 2008/0015742 A1* | 1/2008 | Kulyk | | H02J 3/144 700/295 |
| 2008/0173034 A1* | 7/2008 | Shaw | | F25B 13/00 62/160 |
| 2008/0183335 A1* | 7/2008 | Poth | | F24F 11/88 700/276 |
| 2008/0191045 A1* | 8/2008 | Harter | | F24F 11/61 236/46 R |
| 2008/0273754 A1* | 11/2008 | Hick | | G08B 13/1968 382/103 |
| 2008/0317292 A1* | 12/2008 | Baker | | G06V 40/12 382/115 |
| 2009/0171862 A1* | 7/2009 | Harrod | | F24F 11/30 700/278 |
| 2009/0254225 A1* | 10/2009 | Boucher | | G06Q 50/06 700/295 |
| 2009/0259713 A1* | 10/2009 | Blumrich | | G06F 15/17381 714/E11.178 |
| 2009/0297901 A1* | 12/2009 | Kilian | | H01M 8/04626 429/443 |
| 2009/0327354 A1* | 12/2009 | Resnick | | H04L 67/1095 |
| 2010/0019051 A1* | 1/2010 | Rosen | | F24F 11/30 236/46 R |
| 2010/0025483 A1* | 2/2010 | Hoeynck | | H02J 3/14 236/1 C |
| 2010/0050004 A1* | 2/2010 | Hamilton, II | | G06F 1/329 713/320 |
| 2010/0070084 A1* | 3/2010 | Steinberg | | F24F 11/47 700/276 |
| 2010/0070086 A1* | 3/2010 | Harrod | | G05B 19/042 422/123 |
| 2010/0070234 A1* | 3/2010 | Steinberg | | F24F 11/30 702/182 |
| 2010/0084482 A1* | 4/2010 | Kennedy | | F24F 11/52 700/277 |
| 2010/0167783 A1* | 7/2010 | Alameh | | H03K 17/945 455/556.1 |
| 2010/0179704 A1* | 7/2010 | Ozog | | G06Q 10/06315 703/2 |
| 2010/0211224 A1* | 8/2010 | Keeling | | F24F 13/0209 700/277 |
| 2010/0262298 A1* | 10/2010 | Johnson | | F24F 11/30 700/277 |
| 2010/0262299 A1* | 10/2010 | Cheung | | F24F 11/30 236/51 |
| 2010/0280667 A1* | 11/2010 | Steinberg | | F24F 11/30 700/276 |
| 2010/0289643 A1* | 11/2010 | Trundle | | F24F 11/47 340/3.1 |
| 2010/0308119 A1* | 12/2010 | Steinberg | | F24F 11/30 236/51 |
| 2010/0318227 A1* | 12/2010 | Steinberg | | F24F 11/89 700/278 |
| 2011/0046792 A1* | 2/2011 | Imes | | G05F 1/66 700/278 |
| 2011/0046805 A1* | 2/2011 | Bedros | | H04L 12/2809 700/291 |
| 2011/0046806 A1* | 2/2011 | Nagel | | H04L 67/125 700/291 |
| 2011/0077758 A1* | 3/2011 | Tran | | G16H 40/67 700/282 |
| 2011/0077896 A1* | 3/2011 | Steinberg | | F24F 11/58 702/130 |
| 2011/0151837 A1* | 6/2011 | Winbush, III | | H04W 8/22 455/414.1 |
| 2011/0160913 A1* | 6/2011 | Parker | | F24D 19/1048 700/291 |
| 2011/0185895 A1* | 8/2011 | Freen | | G01N 15/08 95/25 |
| 2011/0307103 A1* | 12/2011 | Cheung | | G05B 19/048 700/278 |
| 2011/0307112 A1* | 12/2011 | Barrilleaux | | H05B 47/105 700/291 |
| 2012/0017611 A1* | 1/2012 | Coffel | | F24F 11/77 62/89 |
| 2012/0065935 A1* | 3/2012 | Steinberg | | F24F 11/30 702/182 |
| 2012/0085831 A1* | 4/2012 | Kopp | | F24F 11/63 236/46 A |
| 2012/0101637 A1* | 4/2012 | Imes | | H04L 12/2825 700/278 |
| 2012/0158350 A1* | 6/2012 | Steinberg | | F24F 11/47 702/130 |
| 2012/0221151 A1* | 8/2012 | Steinberg | | F24F 11/62 700/276 |
| 2012/0248210 A1* | 10/2012 | Warren | | F24F 11/30 236/1 C |
| 2012/0252430 A1* | 10/2012 | Imes | | G05D 23/1919 455/418 |
| 2013/0018513 A1* | 1/2013 | Metselaar | | F24F 11/523 700/278 |
| 2013/0099008 A1* | 4/2013 | Aljabari | | F24F 11/63 236/1 C |
| 2013/0099124 A1* | 4/2013 | Filson | | F24F 11/00 250/353 |
| 2014/0015423 A1* | 1/2014 | Williams | | H05B 47/105 315/161 |
| 2014/0324232 A1* | 10/2014 | Modi | | H04W 4/80 700/278 |
| 2014/0355650 A1* | 12/2014 | Hong | | G01K 7/22 374/170 |
| 2016/0231755 A1 | 8/2016 | Ajax et al. | | |
| 2017/0059190 A1* | 3/2017 | Stefanski | | F24F 11/46 |
| 2017/0299215 A1* | 10/2017 | Li | | F24F 11/58 |
| 2019/0293494 A1* | 9/2019 | Mao | | G01K 7/427 |
| 2022/0026086 A1* | 1/2022 | Martinez | | F24F 11/88 |
| 2022/0065704 A1* | 3/2022 | Mitchell | | G05D 23/1917 |

FOREIGN PATENT DOCUMENTS

| | | |
|---|---|---|
| JP | S59106311 A | 6/1984 |
| JP | H01252850 A | 10/1989 |
| WO | 2014-176176 A1 | 10/2014 |

OTHER PUBLICATIONS

Aprilaire Electronic Thermostats Model 8355 User's ManualResearch Products Corporation, Dec. 2000, 16 pages.

Braeburn 5300 Installer Guide, Braeburn Systems, LLC, Dec. 9, 2009, 10 pages.

Braeburn Model 5200, Braeburn Systems, LLC, Jul. 20, 2011, 11 pages.

Ecobee Smart Si Thermostat Installation Manual, Ecobee, Apr. 3, 2012, 40 pages.

Ecobee Smart Si Thermostat User Manual, Ecobee, Apr. 3, 2012, 44 pages.

Ecobee Smart Thermostat Installation Manual, Jun. 29, 2011, 20 pages.

Ecobee Smart Thermostat User Manual, May 11, 2010, 20 pages.

Electric Heat Lock Out on Heat Pumps, Washington State University Extension Energy Program, Apr. 2010, pp. 1-3.

Honeywell Installation Guide FocusPRO TH6000 Series, Honeywell International, Inc., Jan. 5, 2012, 24 pages.

Honeywell Operating Manual FocusPRO TH6000 Series, Honeywell International, Inc., Mar. 25, 2011, 80 pages.

Honeywell Prestige THX9321 and TXH9421 Product Data, Honeywell International, Inc., 68-0311, Jan. 2012, 126 pages.

(56) References Cited

OTHER PUBLICATIONS

Honeywell Prestige THX9321-9421 Operating Manual, Honeywell International, Inc., Jul. 6, 2011, 120 pages.
Hunter Internet Thermostat Installation Guide, Hunter Fan Co., Aug. 14, 2012, 8 pages.
Introducing the New Smart Si Thermostat, Datasheet [online], retrieved from the Internet: <URL https://www.ecobee.com/solutions/home/smart-si/> [retrieved on Feb. 25, 2013], Ecobee, Mar. 12, 2012, 4 pages.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Lux PSPU732T Manual, LUX Products Corporation, Jan. 6, 2009, 48 pages.
NetX RP32-WIFI Network Thermostat Consumer Brochure, Network Thermostat, May 2011, 2 pages.
NetX RP32-WIFI Network Thermostat Specification Sheet, Network Thermostat, Feb. 28, 2012, 2 pages.
Robertshaw Product Manual 9620, Maple Chase Company, Jun. 12, 2001, 14 pages.
Robertshaw Product Manual 9825i2, Maple Chase Company, Jul. 17, 2006, 36 pages.
SYSTXCCUIZ01-V Infinity Control Installation Instructions, Carrier Corp, May 31, 2012, 20 pages.
T8611G Chronotherm IV Deluxe Programmable Heat Pump Thermostat Product Data, Honeywell International Inc., Oct. 1997, 24 pages.
TB-PAC, TB-PHP, Base Series Programmable Thermostats, Carrier Corp, May 14, 2012, 8 pages.
The Perfect Climate Comfort Center PC8900A W8900A-C Product Data Sheet, Honeywell International Inc., Apr. 2001, 44 pages.
TP-PAC, TP-PHP, TP-NAC, TP-NHP Performance Series AC/HP Thermostat Installation Instructions, Carrier Corp, Sep. 2007, 56 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat User Guide, Honeywell International, Inc., Aug. 2012, 48 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
Akhlaghinia et al., Occupancy Monitoring in Intelligent Environment through Integrated Wireless Localizing Agents, IEEE, 2009, 7 pages.
Akhlaghinia et al., Occupant Behaviour Prediction in Ambient Intelligence Computing Environment, Journal of Uncertain Systems, vol. 2, No. 2, 2008, pp. 85-100.
Allen et al., Real-Time Earthquake Detection and Hazard Assessment by ElarmS Across California, Geophysical Research Letters, vol. 36, L00B08, 2009, pp. 1-6.
Chatzigiannakis et al., Priority Based Adaptive Coordination of Wireless Sensors and Actors, Q2SWinet '06, Oct. 2006, pp. 37-44.
Deleeuw, Ecobee WiFi Enabled Smart Thermostat Part 2: The Features Review, retrieved from <URL: http://www.homenetworkenabled.com/content.php7136-ecobee-WiFi-enabled-Smart-Thermostat-Part-2-The-Features-review> [retrieved on Jan. 8, 2013], Dec. 2, 2011, 5 pages.
Gao et al., The Self-Programming Thermostat: Optimizing Setback Schedules Based on Home Occupancy Patterns, In Proceedings of the First ACM Workshop on Embedded Sensing Systems for Energy-Efficiency in Buildings, Nov. 3, 2009, 6 pages.
Loisos et al., Buildings End-Use Energy Efficiency: Alternatives to Compressor Cooling, California Energy Commission, Public Interest Energy Research, Jan. 2000, 80 pages.
Lu et al., The Smart Thermostat: Using Occupancy Sensors to Save Energy in Homes, In Proceedings of the 8th ACM Conference on Embedded Networked Sensor Systems, Nov. 3-5, 2010, pp. 211-224.
Mozer, The Neural Network House: An Environmental that Adapts to its Inhabitants, Proceedings of the American Association for Artificial Intelligence SS-98-02, 1998, pp. 110-114.
Ros et al., Multi-Sensor Human Tracking with the Bayesian Occupancy Filter, IEEE, 2009, 8 pages.
Wong et al., Maximum Likelihood Estimation of ARMA Model with Error Processes for Replicated Observations, National University of Singapore, Department of Economics, Working Paper No. 0217, Feb. 2002, pp. 1-19.
International Search Report and Written Opinion dated Aug. 28, 2014 in International Patent Application No. PCT/US2014/034836, 15 pages.
International Preliminary Report on Patentability dated Oct. 27, 2015 in International Patent Application No. PCT/US2014/034836 11 pages.

\* cited by examiner

TEMPERATURE SENSOR ISOLATION IN SMART-HOME DEVICES

TECHNICAL FIELD

This patent specification relates to systems, methods, and related computer program products for the monitoring and control of energy-consuming systems or other resource-consuming systems. More particularly, this patent specification relates to isolating a temperature sensor from various internal heating effects in a smart-home device.

BACKGROUND

Digital electronic thermostats have been used for years to regulate temperatures within enclosures, such as homes, office buildings, warehouses, and so forth. Thermostats generally operate by sensing and ambient temperature within at least a portion of a structure. The thermostat then operates an HVAC system such that the ambient temperature can be conditioned to approach a setpoint temperature that is either set by the user or retrieved from a programmed control schedule. Accurately conditioning the temperature within an enclosure may rely in large part upon the accuracy of the thermostat in estimating the ambient temperature in the surrounding enclosure. To accurately estimate the indoor temperature, thermostats rely at least in part on one or more internal temperature sensors. These temperature sensors are placed within the housing of the thermostat and used to since the temperature of the area immediately surrounding the thermostat.

Digital electronic thermostats typically employ integrated circuits that control the flow of electric power to a Heating, Ventilation, and Air Conditioning (HVAC) system. Electronic circuits may include switching elements, rectifiers, and/or microprocessors. More modern thermostats also include advanced features, such as active user interfaces, wireless communications, local wireless network generation, high-power processors for computing complex time estimates and temperature-control algorithms, and/or other electronic components. Each of these electronic components may generate heat as a byproduct of their normal operation. As heat is generated by these components within the thermostat housing, excessive internal heat may build up as each of these components operates. This generation of internal heat, or "self-heating" of the thermostat may interfere with the accurate measurement of the ambient temperature by the internal temperature sensors. This problem is compounded when the electronic components of the thermostat are switched on and off at irregular intervals in order to save power, and the internal heating becomes unpredictable using conventional techniques. The inaccuracies caused by this internal heating not only affect the temperature sensors, but in turn also affect the ability of the thermostat to condition the surrounding environment efficiently, which may cause the thermostat to no longer meet its intended purpose.

BRIEF SUMMARY

In some embodiments, a smart-home device may include a housing, a printed circuit board (PCB) inside the housing, an environmental sensor mounted to the PCB inside the housing, and, a gasket. The gasket may enclose the environmental sensor inside the housing to isolate the environmental sensor from an atmosphere inside of the housing while allowing an atmosphere outside of the housing to enter the gasket such that the environmental sensor can measure an aspect of the atmosphere outside of the housing.

In some embodiments, a method of isolating environmental sensors from internal atmospheres of smart-home devices may include mounting an environmental sensor to a printed circuit board (PCB), mounting the PCB inside a housing of a smart-home device, and enclosing the environmental sensor inside a gasket to isolate the environmental sensor from an atmosphere inside of the housing while allowing an atmosphere outside of the housing to enter the gasket such that the environmental sensor can measure an aspect of the atmosphere outside of the housing.

In any embodiment, one or more of the following features may be implemented in any combination and without limitation. The environmental sensor may be mounted approximately along a bottom edge of the PCB. The gasket may include a slot configured to receive the bottom edge of the PCB such that the gasket wraps around the bottom edge of the PCB. The environmental sensor may be mounted to a first side of the PCB, and the gasket may further isolate a portion of a second side of the PCB that is opposite of a location where the environmental sensor is mounted to the first side of the PCB. The housing may include a first hole surrounded by the gasket providing access to the atmosphere outside of the housing. The gasket may include a second hole such that the atmosphere outside of the housing can flow between the first hole and the second hole. The PCB may include a cutout that surrounds at least three sides of the environmental sensor. The PCB may include a ground plane that does not run beneath the environmental sensor. The PCB may include a plurality of heat-generating components that heat the atmosphere inside of the housing when the plurality of heat-generating components operate. The PCB may include one or more slots configured to receive one or more tabs of the gasket to align the gasket relative to the environmental sensor on the PCB. The smart-home device may include a thermostat. The smart-home device may include a digital home assistant. The environmental sensor may include a temperature sensor. The environmental sensor may include a humidity sensor.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A smart thermostat refers to a thermostat that can communicate via a network and allows a user to interact with the smart thermostat from a remote location, such as via a mobile device (e.g., smartphone, tablet computer, desktop computer, laptop computer, etc.). Additionally or alternatively, a smart thermostat has advanced features such as sensing as to whether any persons are in the vicinity of the smart thermostat and adjusting a setpoint temperature of the thermostat based on the sensed occupancy.

When a smart thermostat is installed, such as in a user's home, the user may desire that the smart thermostat be relatively easy to interact with and is also aesthetically pleasing. Embodiments detailed herein are directed to smart thermostats that can include a touch strip that is used by the user to provide input directly to the smart thermostat. In some embodiments, the touch strip is the only user interface present on the smart thermostat. Additionally, the user can interact with the thermostat via an application executed on a mobile device.

The smart thermostat may have a mirrored cover on a face of the thermostat. When the electronic display is turned off, the mirrored cover may have the visual effect of appearing to be a mirror to a user viewing the face of the thermostat. When the electronic display is illuminated, the mirrored cover has a sufficient transmissivity to allow the illuminated portion of the electronic display to be viewed by the user through the cover. In some embodiments, the cover does not have any cutouts, holes, lenses, or variations on the front surface that could be visible to the user.

The smart thermostat may have a radar sensor. The radar sensor may sense the ambient environment of the smart thermostat through the cover. The cover may use one or more ceramic oxide layers to achieve reflectivity rather than using any metallic layers. In some embodiments, no metallic layer is present within the cover. The lack of a metallic layer can help increase the transmissivity for electromagnetic radiation (or radio waves) emitted by the radar sensor and received by the radar sensor through the cover.

Figure 1:
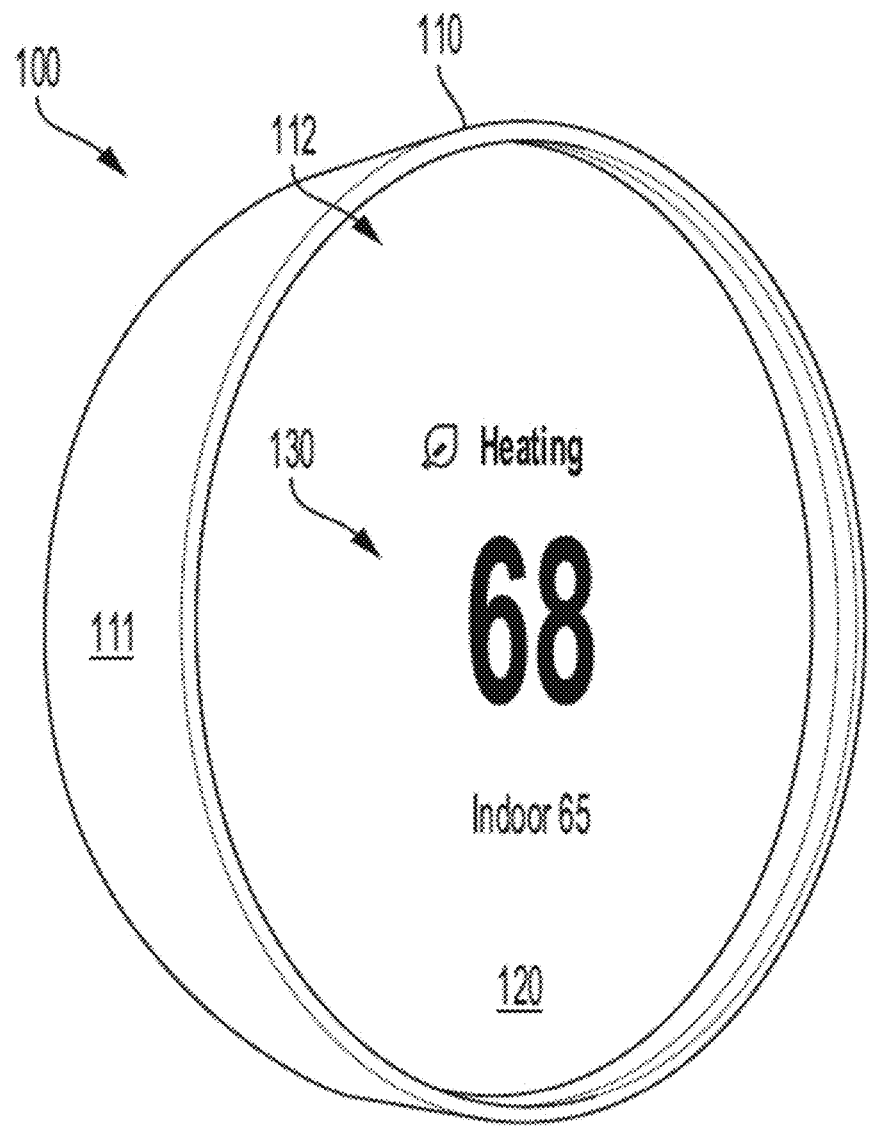
FIG. 1 illustrates a smart thermostat with an electronic display presenting information, according to some embodiments.

Further detail regarding the smart thermostat is provided in relation to the figures. FIG. 1 illustrates a smart thermostat 100 with an electronic display presenting information, according to some embodiments. As visible in FIG. 1, housing 110, cover 120, and a portion of an illuminated electronic display 130 ("display 130") can be seen.

Housing 110 defines rounded aperture 112, such as a circular aperture, in which cover 120 may be attached with housing 110. Housing 110 includes sidewall 111. In the illustrated embodiment, sidewall 111 is generally cylindrical. Around an axis perpendicular to cover 120, a radius of sidewall 111 may be greater at front of housing 110 where cover 120 is housed and smaller toward a back of housing 110.

Cover 120 is housed by housing 110 such that within aperture 112 cover 120 is visible when the front of smart thermostat 100 is viewed. Cover 120 can have a reflectivity such that when display 130 is not illuminated, cover 120 appears to be a mirror when viewed by a user.

Display 130 is housed behind cover 120 such that, when illuminated, the portion of display 130 that is illuminated is visible through cover 120 by a user. In some embodiments, due to the reflectivity of cover 120, an edge of display 130 is not visible to a user regardless of whether display 130 is illuminated, partially illuminated, or not illuminated. Therefore, the overall effect experienced by a user may be that cover 120 appears as a mirror and portions of display 130, when illuminated, are visible through cover 120.

In some embodiments, display 130 is not a touch screen. Therefore, in such embodiments, a user is required to use another user interface to interact with smart thermostat 100. The user may use an application executed by a mobile device to interact with the thermostat via a wireless network or a direct wireless connection (e.g., Bluetooth). A user interface, such as a capacitive touch strip, may be present on smart thermostat 100. In some embodiments, the capacitive touch strip is the only user interface present on smart thermostat through which a user can interact with presented menus, icons, and other data presented on display 130. Further, in some embodiments, no user interface present on smart thermostat 100 has any moving parts. When smart thermostat 100 is fully installed, no components may be accessible or visible to the user that are movable.

Figure 2:
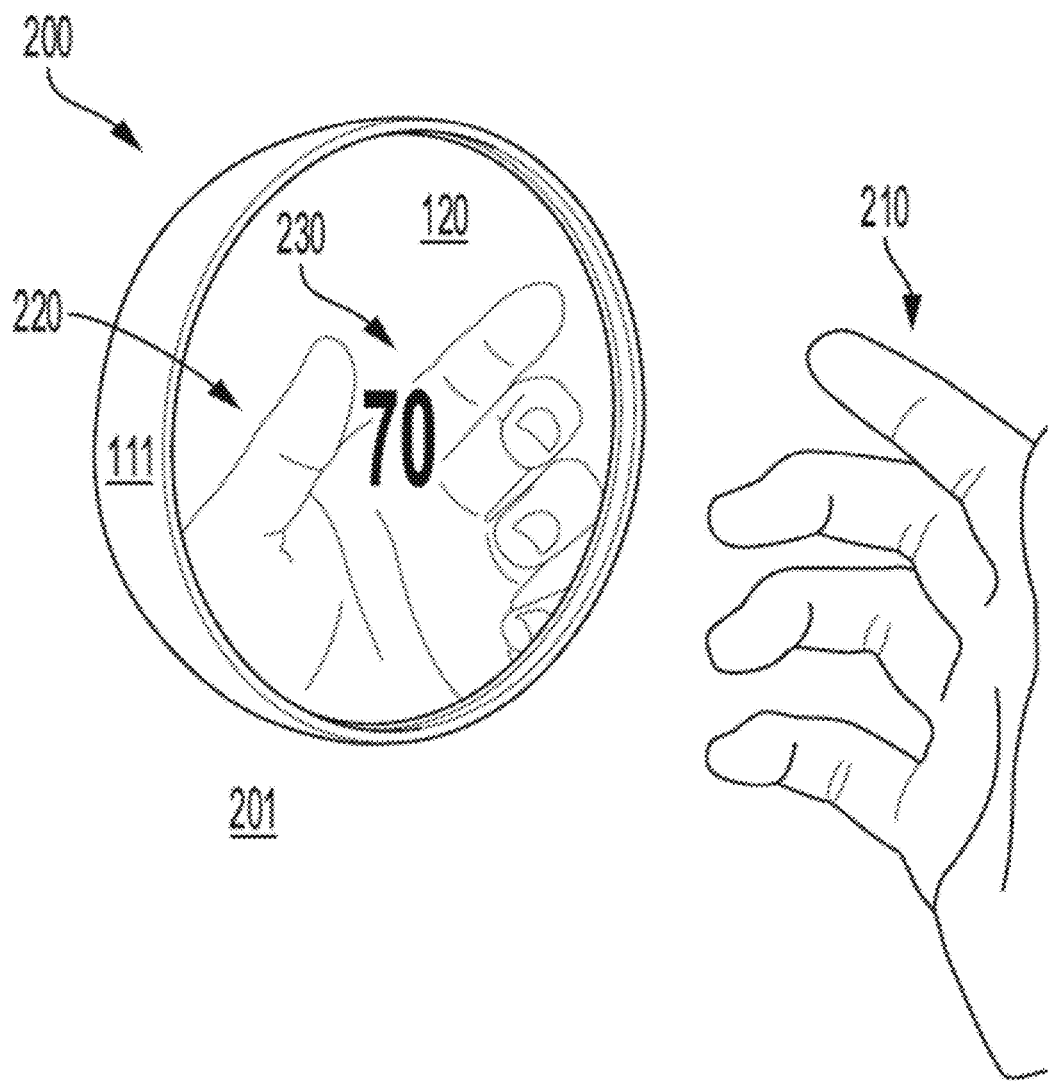
FIG. 2 illustrates a user's hand being present near thermostat that is mounted to a wall, according to some embodiments.

FIG. 2 illustrates a view 200 of a user's hand being present near thermostat 100 that is mounted to wall 201, according to some embodiments. In embodiment 200, cover 120 is sufficiently reflective that a reflection 220 of user's hand 210 is visible. Cover 120 has a sufficient transmissivity that temperature 230, as presented by display 130 through cover 120, is also visible. To calculate transmittance, a perception weighted average can be used. In some embodiments, such as those in which cover 120 appears to have a "silver" tint, transmissivity may be 29%. For other colors, such as when cover 120 has a "rose" or "nickel" tint, transmissivity may be 22% and 18.6% respectively. In other embodiments, transmissivity may be between 15% and 55%. Reflectivity may be between 75% and 40% depending on embodiment.

As can be seen in embodiment 200, except for portions of display 130 that are illuminated, cover 120 appears as an uninterrupted surface with no gaps, holes, lens, or other discontinuities present on cover 120.

Figure 3A:
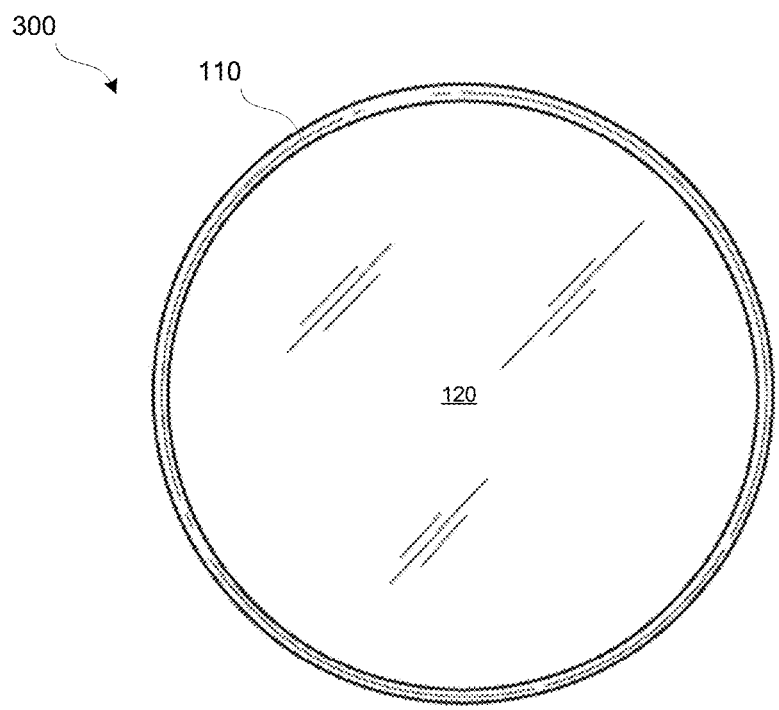
FIG. 3A-3B illustrates a smart thermostat as viewed from the front and the right, according to some embodiments.

FIG. 3A illustrates a smart thermostat 300 as viewed from the front, according to some embodiments. When mounted on a wall or other surface, cover 120 is opposite the portion of thermostat 300 that mounts to the wall or other surface. Therefore, when a user is facing mounted thermostat 300, cover 120 is visible.

Smart thermostat 300 can represent an embodiment of thermostat 100 of FIGS. 1 and 2. Housing 110 can define a rounded aperture in which cover 120 is located. In some embodiments, housing 110 defines a circular aperture in which cover 120 is located. In such embodiments, cover 120 can be circular. As previously detailed, cover 120 can form an uninterrupted surface with no gaps, holes, lens, or other discontinuities present on cover 120. Cover 120 has sufficient transmissivity to allow light emitted by electronic display 130 located within housing 110 to be visible through cover 120. Cover 120 can have sufficient reflectivity such that a mirrored effect is present on portions of cover 120 that are not currently being illuminated from behind by electronic display 130. Notably, in some embodiments, it is not possible for a user to view where an edge of electronic display 130 is through cover 120 due to the reflectivity of cover 120.

Figure 3B:
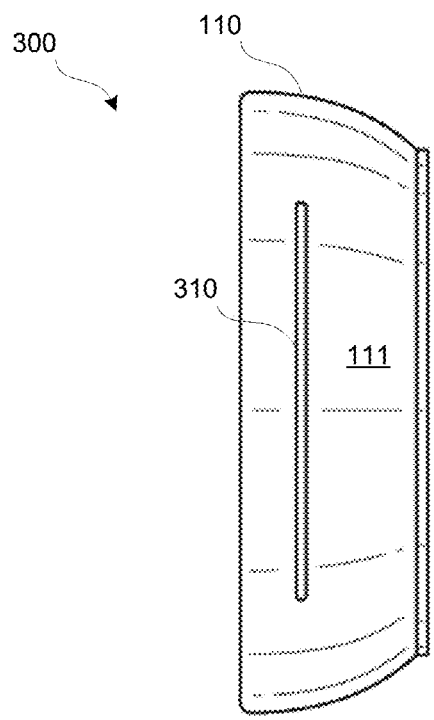

FIG. 3B illustrates a smart thermostat 300 as viewed from the right, according to some embodiments. Thermostat 300 can represent thermostat 100 of FIG. 1. When thermostat 300 is mounted to a wall or other surface, touch strip indicator 310 may be visible on the right side of sidewall 111. Touch strip indicator 310 may be a visible indicator, such as a line, shading, or some form of shape or marking that serves as a visible indicator as to where a user can touch sidewall 111 to provide user input. Within housing 110, on an inner side of the sidewall opposite touch strip indicator 310, can be a touch strip that can detect one or more types of gestures performed by a user on or near touch strip indicator 310. For example, a user can perform a tap gesture (touch and release), a swipe gesture (e.g., swipe upward along touch strip indicator 310, swipe downward along touch strip indicator 310), or a long hold gesture (touch and hold for at least a threshold amount of time).

The touch strip may be capacitive and, through sidewall 111 of housing 110, a user's touch against sidewall 111 can be detected. Touch strip indicator 310 may serve to indicate to a user the region in which the user's touch is sensed. Any gesture performed significantly away from touch strip indicator 310 may be unlikely to be sensed by the touch strip. The touch strip located within housing 110 may represent the only user input component present on thermostat 300 through which a user can directly provide input to thermostat 300. Additionally, a user may use an application or website executed on another computerized device to interact with thermostat 300.

The tactile sensation when a user moves his finger over touch strip indicator 310 might be no different than sidewall 111. Alternatively, touch strip indicator 310 may have a variance in protrusion or texture from sidewall 111 so that a user can determine the location of touch strip indicator 310 by touch. For instance, a multi-layer (e.g., 4 layer) pad print may be performed to create touch strip indicator 310 such that a subtle protrusion of touch strip indicator 310 is present. Such an arrangement may be beneficial when interacting with thermostat 300 in a darkened environment.

In the embodiment of thermostat 300, touch strip indicator 310 and the corresponding touch strip are located on a right side of thermostat 300 when viewed from the front (such as seen in FIG. 3). In other embodiments, the touch strip and corresponding touch strip indicator 310 may be present on a top, bottom, or left of sidewall 111. In some embodiments, multiple touch strips may be present, such as on the left and right of sidewall 111.

Figure 4:
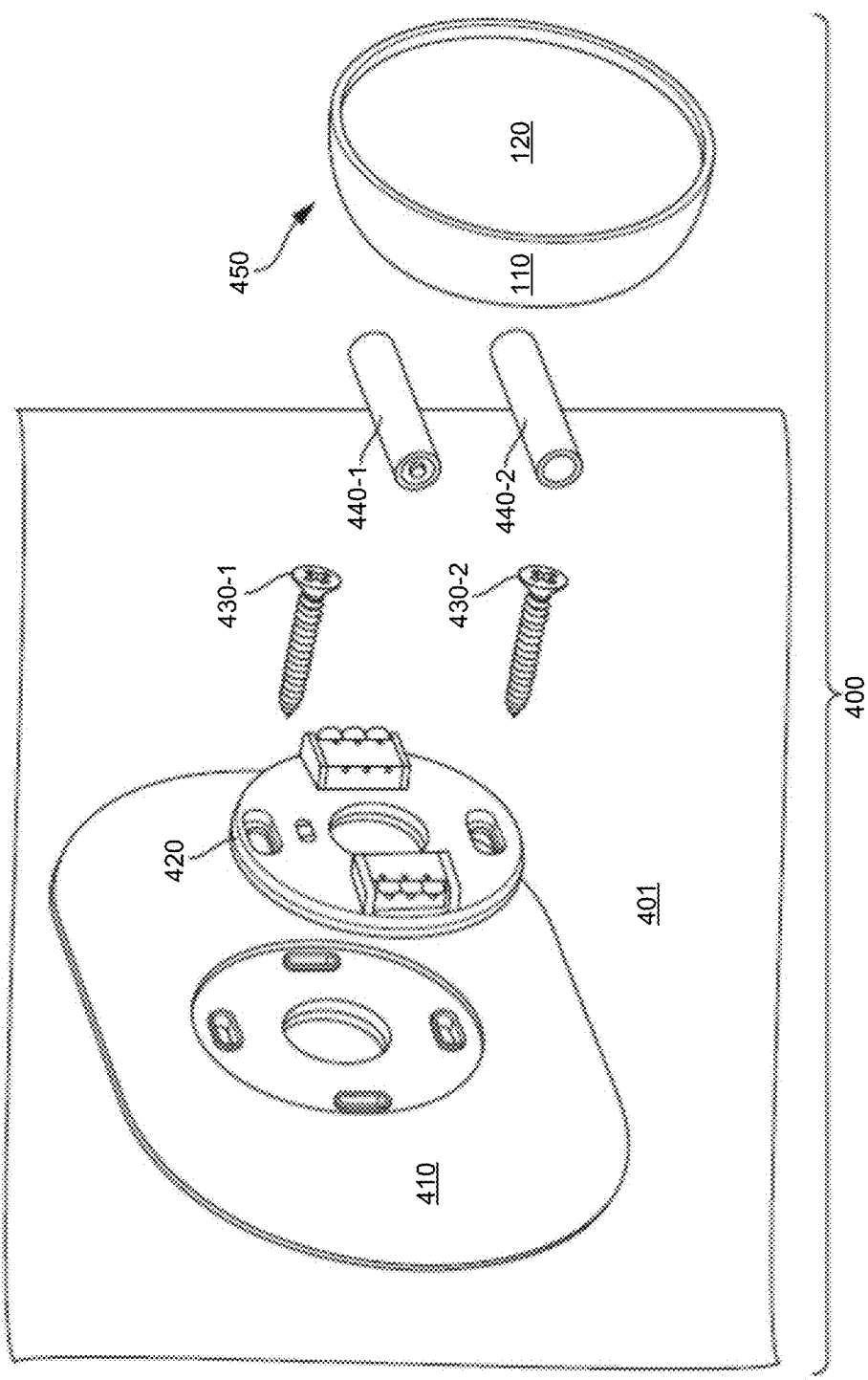
FIG. 4 illustrates a thermostat mounting system, according to some embodiments.

FIG. 4 illustrates a thermostat mounting system 400, according to some embodiments. Thermostat mounting system 400 can include: trim plate 410; backplate 420; fasteners 430; batteries 440; and thermostat 450. Thermostat 450 can represent an embodiment of thermostat 100 of FIG. 1 and the other thermostat embodiments detailed herein. Trim plate 410 may be plastic, wooden, or metallic plate that defines several holes to accommodate fasteners 430 and allow HVAC (heating, ventilation, and air conditioning) control wires to pass through. Trim plate 410 may serve to conceal any unsightly holes present in wall 401, such as where previous drilling occurred, electrical boxes, paint mismatches, or other aesthetic variances.

Backplate 420 may include multiple receptacles, with each receptacle designated to receive a particular HVAC control wire. Backplate 420 can define one or more holes configured to receive fasteners 430. Fasteners 430 can secure backplate 420 and, if being used, trim plate 410, to a surface, such as a wall.

In some embodiments, two fasteners, fastener 430-1 and fastener 430-2 may be presented. Fasteners 430 may be screws, nails, or some other form of fastener. Fasteners 430 can securely hold backplate 420 and, possibly, trim plate 410 to a surface, such as a wall. Thermostat 450 may removably attach with backplate 420. A user may be able to attach thermostat 450 to backplate 420 by pushing thermostat 450 against backplate 420. Similarly, a user can remove thermostat 450 from backplate 420 by pulling thermostat 450 away from backplate 420. When thermostat 450 is connected with backplate 420, electrical connections between thermostat 450 and HVAC control wires that have been connected with the receptacles of backplate 420.

In some embodiments, HVAC control wires can include a "C" wire, which stands for common wire. The C wire delivers power, such as in the form of 24 V AC, to thermostat 450. Thermostat 450, being connected with a C wire (and, possibly an "R" wire, which is typically red), can have access to a power supply that does not need to be periodically replaced or recharged, such as batteries 440. In some embodiments, if a C wire is not present, thermostat 450 can function using batteries 440 as its exclusive power source.

Batteries 440, which can include one or more batteries, such as battery 440-1 and battery 440-2, can serve as a primary power source or as a backup power source. In some embodiments, one or more features of thermostat 450 can be disabled if only batteries 440 are available as a power supply. Batteries 440 may be replaceable by a user. Batteries 440 may be rechargeable.

Figure 5:
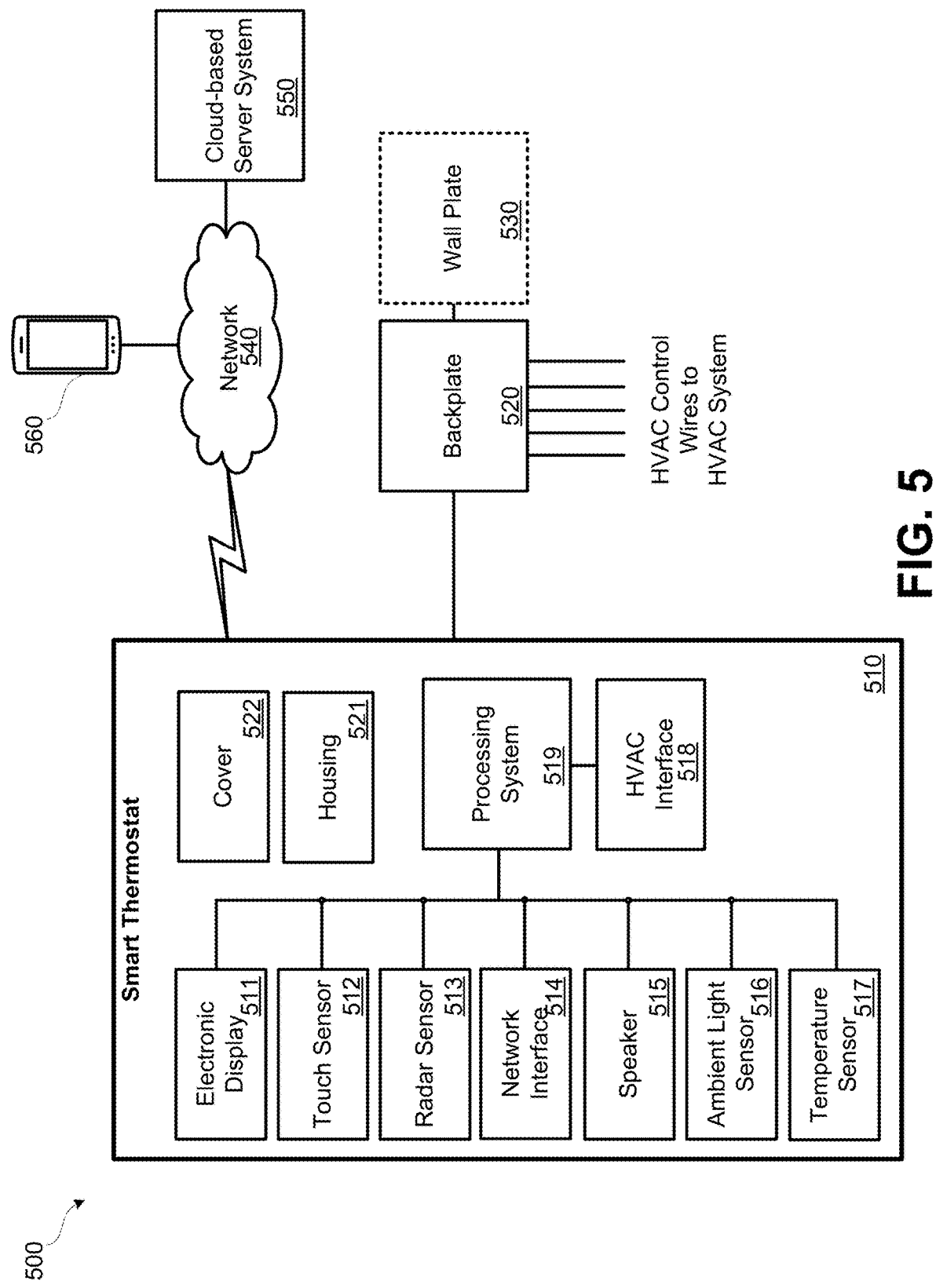
FIG. 5 illustrates a smart thermostat system, according to some embodiments.

FIG. 5 illustrates a smart thermostat system 500, according to some embodiments. Smart thermostat system 500 can include smart thermostat 510; backplate 520; trim plate 530; network 540; cloud-based server system 550; and computerized device 560. Smart thermostat 510 can represent any of the thermostats detailed in relation to FIGS. 1-4. Thermostat 510 can include: electronic display 511; touch sensor 512; radar sensor 513; network interface 514; speaker 515; ambient light sensor 516; temperature sensor 517; HVAC interface 518; processing system 519; housing 521; and cover 522.

Electronic display 511 may be visible through cover 522. In some embodiments, electronic display 511 is only visible when electronic display 511 is illuminated. In some embodiments, electronic display 511 is not a touch screen. Touch sensor 512 may allow one or more gestures, including tap and swipe gestures, to be detected. Touch sensor 512 may be a capacitive sensor that includes multiple electrodes. In some embodiments, touch sensor 512 is a touch strip that includes five or more electrodes.

Radar sensor 513 may be configured to output radio waves into the ambient environment in front of electronic display 511 of thermostat 510. Radar sensor 513 may be an integrated circuit that includes one or more antennas, one or more RF emitters, and one or more RF receivers. Radar sensor 513 may be able to detect the presence of a user and the distance at which the user is located. Radar sensor 513 may use frequency-modulated continuous wave (FMCW) radar. Radar sensor 513 may emit radio waves and receive reflected radio waves through cover 522. Radar sensor 513 may emit chirps of radar that sweep from a first frequency to a second frequency. Therefore, the waveform output by radar sensor 513 may be a saw tooth waveform. Using receive-side beam steering on the reflected radio waves received using multiple antennas, certain regions may be targeted for sensing the presence of users. For instance, beam steering away from the ground may be performed to avoid pets being potentially incorrectly detected as a user.

Network interface 514 may be used to communicate with one or more wired or wireless networks. Network interface 514 may communicate with a wireless local area network, such as a WiFi network. Additional or alternative network interfaces may also be present. For example, thermostat 510 may be able to communicate with a user device directly, such as using Bluetooth. Thermostat 510 may be able to communicate via a mesh network with various other home automation devices. Mesh networks may use relatively less power compared to wireless local area network-based communication, such as WiFi. In some embodiments, thermostat 510 can serve as an edge router that translates communications between a mesh network and a wireless network, such as a WiFi network. In some embodiments, a wired network interface may be present, such as to allow communication with a local area network (LAN). One or more direct wireless communication interfaces may also be present, such as to enable direct communication with a remote temperature sensor installed in a different housing external and distinct from housing 521. The evolution of wireless communication to fifth generation (5G) and sixth generation (6G) standards and technologies provides greater throughput with lower latency which enhances mobile broadband services. 5G and 6G technologies also provide new classes of services, over control and data channels, for vehicular networking (V2X), fixed wireless broadband, and the Internet of Things (IoT). Thermostat 510 may include one or more wireless interfaces that can communicate using 5G and/or 6G networks.

Speaker 515 can be used to output audio. Speaker 515 may be used to output beeps, clicks, or other audible sounds, such as in response to the detection of user input via touch sensor 512.

Ambient light sensor 516 may sense the amount of light present in the environment of thermostat 510. Measurements made by ambient light sensor 516 may be used to adjust the brightness of electronic display 511. In some embodiments, ambient light sensor 516 senses an amount of ambient light through cover 522. Therefore, compensation for the reflectivity of cover 522 may be made such that the ambient light levels are correctly determined via ambient light sensor 516. A light pipe may be present between ambient light sensor 516 and cover 522 such that in a particular region of cover 522, light that is transmitted through cover 522, is directed to ambient light sensor 516, which may be mounted to a printed circuit board (PCB), such as a PCB to which processing system 519 is attached.

One or more temperature sensors, such as temperature sensor 517, may be present within thermostat 510. Temperature sensor 517 may be used to measure the ambient temperature in the environment of thermostat 510. One or more additional temperature sensors that are remote from thermostat 510 may additionally or alternatively be used to measure the temperature of the ambient environment.

Cover 522 may have a transmissivity sufficient to allow illuminated portions of electronic display 511 to be viewed through cover 522 from an exterior of thermostat 510 by a user. Cover 522 may have a reflectivity sufficient such that portions of cover 522 that are not illuminated from behind appear to have a mirrored effect to a user viewing a front of thermostat 510.

HVAC interface 518 can include one or more interfaces that control whether a circuit involving various HVAC control wires that are connected either directly with thermostat 510 or with backplate 520 is completed. A heating system (e.g., furnace, heat pump), cooling system (e.g., air conditioner), and/or fan may be controlled via HVAC wires by opening and closing circuits that include the HVAC control wires.

Processing system 519 can include one or more processors. Processing system 519 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD) of thermostat 510.

Processing system 519 may output information for presentation to electronic display 511. Processing system 519 can receive information from touch sensor 512, radar sensor 513, and ambient light sensor 516. Processing system 519 can perform bidirectional communication with network interface 514. Processing system 519 can output information to be output as sound to speaker 515. Processing system 519 can control the HVAC system via HVAC interface 518.

Housing 521 may house all of the components of thermostat 510. Touch sensor 512 may be interacted with a user through housing 521. Housing 521 may define a sidewall and an aperture, such as a rounded aperture (e.g., a circular aperture) in which cover 522 is present.

Thermostat 510 may be attached (and removed) from backplate 520. HVAC control wires may be attached with terminals or receptacles of backplate 520. Alternatively, such control wires may be directly connected with thermostat 510. In some embodiments, trim plate 530 may additionally be installed between backplate 520 and a surface, such as a wall, such as for aesthetic reasons (e.g., cover an unsightly hole through which HVAC wires protrude from the wall.

Network 540 can include one or more wireless networks, wired networks, public networks, private networks, and/or mesh networks. A home wireless local area network (e.g., a Wi-Fi network) may be part of network 540. Network 540 can include the Internet. Network 540 can include a mesh network, which may include one or more other smart home devices, may be used to enable thermostat 510 to communicate with another network, such as a Wi-Fi network. Thermostat 510 may function as an edge router that translates communications from a relatively low power mesh network received from other devices to another form of network, such as a relatively higher power network, such as a Wi-Fi network.

Cloud-based server system 550 can maintain an account mapped to smart thermostat 510. Thermostat 510 may periodically or intermittently communicate with cloud-based server system 550 to determine whether setpoint or schedule changes have been made. A user may interact with thermostat 510 via computerized device 560, which may be a mobile device, smartphone, tablet computer, laptop computer, desktop computer, or some other form of computerized device that can communicate with cloud-based server system 550 via network 540 or can communicate directly with thermostat 510 (e.g., via Bluetooth or some other device-to-device communication protocol). A user can interact with an application executed on computerized device 560 to control or interact with thermostat 510.

Temperature Sensor Isolation

Digital electronic thermostats have been used for years to regulate temperatures within enclosures, such as homes, office buildings, warehouses, and so forth. These digital electronic thermostats typically employ digital integrated circuits that control the flow of electric power to a Heating, Ventilation, and Air Conditioning (HVAC) system. Digital electronic circuits may include switching elements, rectifiers, and/or microprocessors. In some digital electronic thermostats, excessive internal heat may be generated when digital electronic components are in an active, operating state. The generation of internal heat can interfere with the accurate measurement of ambient temperature within the enclosure as required for accurate temperature regulation. Heat generated by digital electronics may cause inaccuracies in the ambient temperature measurements. These inaccuracies may in turn affect the maintenance of a stable temperature within the enclosure.

In addition to temperature sensor measurements being distorted by heat radiated from other electronic components, heat may also be transferred to the temperature sensor through a printed circuit board (PCB) itself. Although the substrate of most PCBs is generally a poor conductor of heat, some measure of thermal energy may still be transmitted between other electronic components and the temperature sensor through this substrate. A more immediate concern may be the transfer of heat through conductive traces and planes in the PCB. Conductors within the PCB are generally fabricated using metal traces or metal planes to create electrical connections between the pins on various board-level electronic components. In some cases, internal layers of the PCB may include entire sheets or planes of conductive materials to form a ground plane and/or power plane for the board. Large stable conductive surfaces may be important in some applications for stability and signal integrity. However, individual traces and large planes may also conduct thermal energy between devices. Therefore, a temperature sensor that is mounted on a PCB may also receive a significant amount of thermal energy through the PCB board itself as well as any conductive traces/planes in the PCB.

The problem of estimating an accurate ambient temperature that is external to the thermostat has been exacerbated in recent years by the inclusion of advanced electronics and communication circuits in smart-home devices. For example, the thermostat 100 described above may include multiple microprocessors, active matrix displays, power regulators, Wi-Fi communication circuits, high-voltage relays, and other electronics that may generate a significant amount of heat during operation. To maintain the compact, integrated look and feel of the thermostat 100, the temperature sensors used to measure and estimate ambient temperature may be placed within the housing of the thermostat. When a raw temperature is measured by the internal temperature sensors, this measurement may generally be significantly higher than the actual ambient temperature outside of the thermostat. The heat-generated components inside the thermostat artificially raise the internal temperature of the thermostat around the internal temperature sensor(s), thereby causing the temperature sensor(s) to read a temperature that is higher than the external ambient temperature. Internal heating may occur by both direct radiation of heat from the heat-generating components that are near the temperature sensors, as well as generally heating air in the internal environment of the thermostat 100 that is contained within the thermostat housing.

Prior to this disclosure, thermostat manufacturers used various sensors and methods to calculate the ambient temperature in a home, often arriving at different ambient room temperature measurements. For example, some thermostats used external temperature sensors to read the ambient temperature outside of the thermostat. However, these required additional wireless communications or unsightly wired connections to the thermostat. External temperature sensors also generally interrupt the self-contained look-and-feel of a modern thermostat. Some thermostats may use multiple temperature sensors distributed in different locations inside the thermostat to estimate an external temperature. For example, a difference between a temperature measured by a sensor in the thermostat housing and a temperature measured by a sensor in the backplate may be scaled to linearly interpolate an external temperature. Alternatively, some thermostats used direct measurements of heat generated by internal components to compensate in a temperature-estimation algorithm. For example, thermocouples or other temperature sensors may be added to a circuit board adjacent (e.g., within 5 mm) to heat-generating components, and the measured temperature may be used to determine how to compensate the ambient temperature measured by the main temperature sensor.

Each of these methods provided some level of satisfactory results in certain situations. However, each of these methods relied on a compensating for the effect of internal heating on the temperature sensor after such heating had already taken place. The embodiments described herein solve the problem of internal heating by instead isolating an internal temperature sensor from the internal environment of the smart-home device. These embodiments implement this thermal isolation in a way that still allows the temperature sensor to be mounted in the smart-home device to maintain its compact and unified look-and-feel. The thermal isolation may be achieved by creating a cutout in the PCB such that the temperature sensor is physically isolated from as much of the shared PCB substrate as possible. This cutout also shields the temperature sensor from most of the conductive traces and power/ground planes in the PCB. Thermal isolation is also achieved by placing an insulating gasket around the temperature sensor that separates the ambient atmosphere around the temperature sensor from the atmosphere within the smart-home device. Openings in the housing of the smart-home device can facilitate airflow through the isolated area in which the temperature sensor is exposed. These features solve many of the technical problems created when internal heating skews temperature measurements in a smart-home device.

In a first aspect, some embodiments may make modifications to a traditional PCB to isolate the temperature sensor from other heat-generated components. Specifically, the thermal architecture may be primarily targeted to isolating a temperature sensor from self-heating effects of other active components through modifications to the construction of the PCB and the placement of the temperature sensor relative to other components. To this extent, the temperature sensor may be placed on a bottom portion of the PCB so that very little heat passes to the temperature sensor through convection and such that there is a minimum physical distance between the temperature sensor and other components. The temperature sensor may also be isolated from any flooded ground plane that conducts heat from other components by preventing such planes from passing near the temperature sensor. Additionally, a cutout may be placed in the PCB to physically isolate the temperature sensor from heat conduction through the PCB. This allows for a low-cost approach, as the temperature sensor may still be part of the same main PCB assembly using these modifications.

Figure 6:
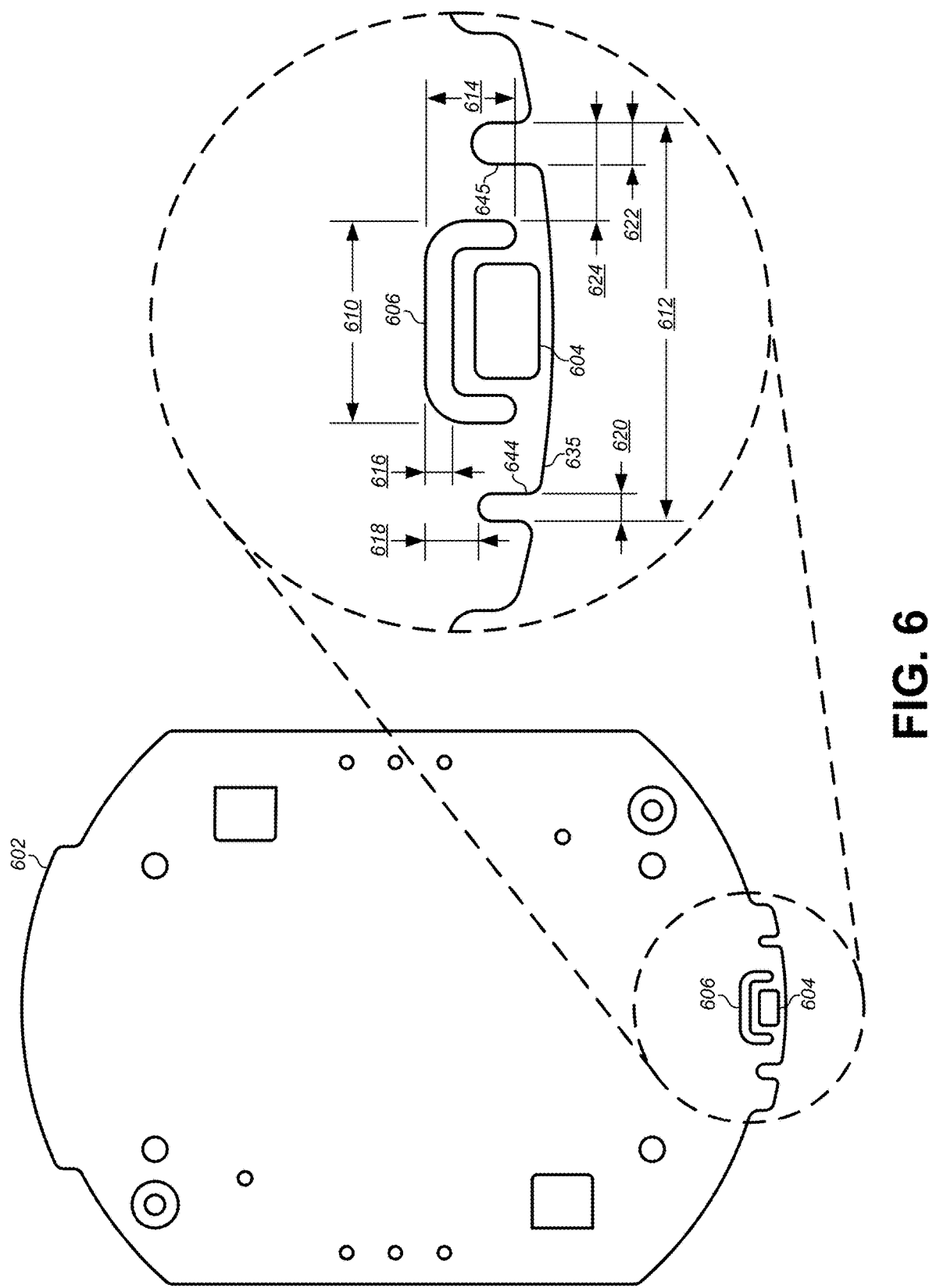
FIG. 6 illustrates a PCB configured to isolate an environmental sensor from the self-heating effects of the internal components of a smart-home device, according to some embodiments.

FIG. 6 illustrates a PCB configured to isolate an environmental sensor from the self-heating effects of the internal components of a smart-home device, according to some embodiments. An environmental sensor 604 may be mounted to a PCB 602. The environmental sensor 604 may be part of an integrated circuit (IC) package that is soldered to metal contacts or pads on the PCB 602. The environmental sensor 604 may include any sensor configured to measure an aspect of the surrounding environment. For example, the environmental sensor 604 may comprise a temperature sensor that is configured to measure a temperature of a surrounding environment. In some embodiments, when the environmental sensor 604 is implemented as a temperature sensor, it may represent the only temperature sensor in the smart-home device, such that additional temperature sensors are not mounted to the PCB 602 and/or otherwise installed inside the housing of the smart-home device. In another example, the environmental sensor 604 may comprise a humidity sensor that is configured to measure the humidity of a surrounding environment. Other environmental sensor types may include light sensors, sound microphones, and so forth.

The PCB 602 may also include one or more additional energy-consuming components mounted to the PCB 602. For example, these energy-consuming components may include processors, wireless communication modules, power relays, solid-state switching circuits, power management systems, power converters, battery-charging circuitry, rechargeable batteries, wire connectors, memory devices, user interfaces, active-display screens, touchscreens, and/or any other electronic components that may be part of a smart-home device. These energy-consuming components may produce side effects that interfere with the measurement of an aspect of the surrounding environment made by the environmental sensor 604. For example, the energy-consuming components may generate heat that skews a temperature measurement by a temperature sensor. Increasing the internal temperature may also increase the internal humidity measured by a humidity sensor. Power relays or other switching circuits may generate noise that interfere with a microphone. Onboard LEDs may generate light that otherwise interferes with a light sensor. Therefore, isolating the environmental sensor 604 from the other energy-consuming components mounted on the PCB 604 or otherwise located within a housing of the smart-home device may improve the functioning of the environmental sensor 604.

Some alternate embodiments may mount the temperature sensor 604 on a separate PCB other than the main PCB 602 for the smart-home device. Although this may partially isolate the environmental sensor 604 from certain types of interference from other energy-consuming components, this leads to an increased cost and manufacturing difficulties. The embodiment of FIG. 6 improves a manufacturing process of the smart-home device and reduces an overall cost by allowing the environmental sensor 604 to be mounted to the main PCB 602 without requiring an entirely separate PCB, such as a flex cable with corresponding connectors to connect to the PCB 602. This allows many of the energy-consuming components and the environmental sensor 604 to be mounted to the PCB 602 in a single soldering process.

As described above, the other energy-consuming components may generate side effects that affect the environmental sensor 604 based on proximity. In one example, in the case of a temperature or humidity sensor, heat generated by the other components on the PCB 602 may reach the environmental sensor 604 through convection. In other words, heat generated by the other components on the PCB 602 may rise and flow upwards through the environmental sensor 604. Embodiments similar to those illustrated in FIG. 6 solve this problem by mounting the environmental sensor 604 approximately along a bottom edge of the PCB 602. The "bottom edge" may be defined relative to a direction which the smart-home device is mounted on a wall. For example, smart-home devices such as the thermostat 100 illustrated in FIG. 1A, have a "bottom" side that is closest to the ground when mounted. FIG. 6 illustrates how the environmental sensor 604 may be mounted on an edge defined as a "bottom edge" 635 of the PCB 602. Additionally, the environmental sensor 604 may be considered to be mounted approximately along the bottom edge of the PCB 602 when it is mounted within a threshold distance of the bottom edge. For example, the environmental sensor 604 may be mounted approximately along the bottom edge 635 of the PCB 602 when it is mounted within 10.0 mm of the bottom edge 635 of the PCB. In some cases, mounting approximately along the bottom edge 635 may be defined relative to a height of the PCB 602. For example, mounting approximately along the bottom edge 635 may be defined as mounting the environmental sensor 604 in a bottom 10% of the height of the PCB 602. In the example of FIG. 6, the environmental sensor 604 is mounted approximately 0.5 mm from the bottom edge 635 of the PCB. By mounting the environmental sensor 604 approximately along the bottom edge 635 of the PCB 602, the environmental sensor 604 may avoid many of the convection currents that may be generated as hot air rises from the other energy-consuming components on the PCB 602.

Mounting the environmental sensor 604 approximately along the bottom edge 635 of the PCB 602 not only serves to protect the environmental sensor 604 from convection heating, but also allows the environmental sensor 604 to be placed near a front or user-facing side of the smart-home device. Many of the heat-generating components of the smart-home device may be placed in a back portion of the smart-home device that is opposite of the user-facing side and nearest to a wall on which the smart-home device is mounted. The PCB itself may shield the environmental sensor 604 from environmental interference generated by these components. Additionally, placement approximately along the bottom edge 635 of the PCB 602 allows the environmental sensor 604 to have access to an atmosphere outside of the housing. As described in detail below, a hole in the housing may be provided to mate with a gasket to allow air from the outside environment to flow around the environmental sensor 604 such that the environmental sensor 604 can accurately measure aspects of the external atmosphere. Placement along the bottom edge 635 allows the environmental sensor 604 to be placed close enough to the housing for this interaction with the outside atmosphere to take place.

In addition to minimizing the effect of interference through convection, some embodiments may also prevent interference through other energy transfer mechanisms, such as conduction and radiation. For example, heat may be transferred from other energy-consuming components on the PCB 602 through the PCB substrate itself. Generally, PCB substrates have a relatively low thermal conductivity of less than 10 W/m-K. The thermal conductivity of the PCB 602 in one example thermostat may be less than 1.0 W/m-K. Although relatively low compared to other thermal conductors, heat from the energy-consuming components on the PCB 602 may heat the substrate of the PCB 602 significantly. This heat may be conducted through the PCB 602 and heat other components on the PCB, such as the environmental sensor 604. Additionally, the heat stored in the PCB 602 may be transferred to the surrounding atmosphere that surrounds the environmental sensor 604.

The embodiments described herein solve this problem of heat conduction through the PCB 602 by providing a cut out 606 in the PCB 602 that surrounds the environmental sensor 604. As illustrated in FIG. 6, the cut out 606 may surround at least a portion of the environmental sensor 604 on, for example, three sides. For example, the cut out 606 completely surrounds a top of the environmental sensor 604 as well as at least a portion of both of the sides of the environmental sensor 604. Note that it is not necessary for the cut out 606 to completely surround a side of the environmental sensor 604. The cut out 606 may create a physical barrier around the environmental sensor 604 such that the heat conducted to the environmental sensor 604 through the PCB 602 is greatly reduced. Additionally, as described in detail below, a gasket may be placed over the environmental sensor 604 to isolate or seal the environmental sensor 604 from the atmosphere inside the housing. The cut out 606 may prevent the portion of the PCB 602 inside the gasket from being heated, and thereby prevents that heat from being radiated into the atmosphere inside the gasket.

The cut out 606 depicted in FIG. 6 may be drawn to scale. For example a length of the cut out 606 represented by dimension 610 may be between approximately 5 mm and approximately 10 mm, including a value of 7.34 mm in some embodiments. The width, or gap created by the cut out 606 represented by dimension 616 may be between approximately 0.5 mm and approximately 3.0 mm, including a value of 1.0 mm in some embodiments. The length that the cut out 606 extends down each of the sides of the environmental sensor 604 represented by dimension 614 may be between approximately 2.0 mm and 5.0 mm, including a value of 3.27 mm in some embodiments. These dimensions are based on an IC package for the environmental sensor 604 that is between approximately 3.0 mm and approximately 5.0 mm wide and between approximately 3.0 mm and 5.0 mm long. Dimension 618 may be approximately 1.68 mm in one embodiment, and dimension 624 may be approximately 3.58 mm in one embodiment. The values for the dimensions described above and other dimensions referenced throughout the remainder of this disclosure, including those of cut out 606, may be scaled as the size of the IC package for the environmental sensor 604 increases or decreases. For example, for an IC package that is 150% of the package ranges described above, the dimensions for the cut out 606, gasket, PCB, etc., may also be scaled by approximately 150%.

Figure 7:
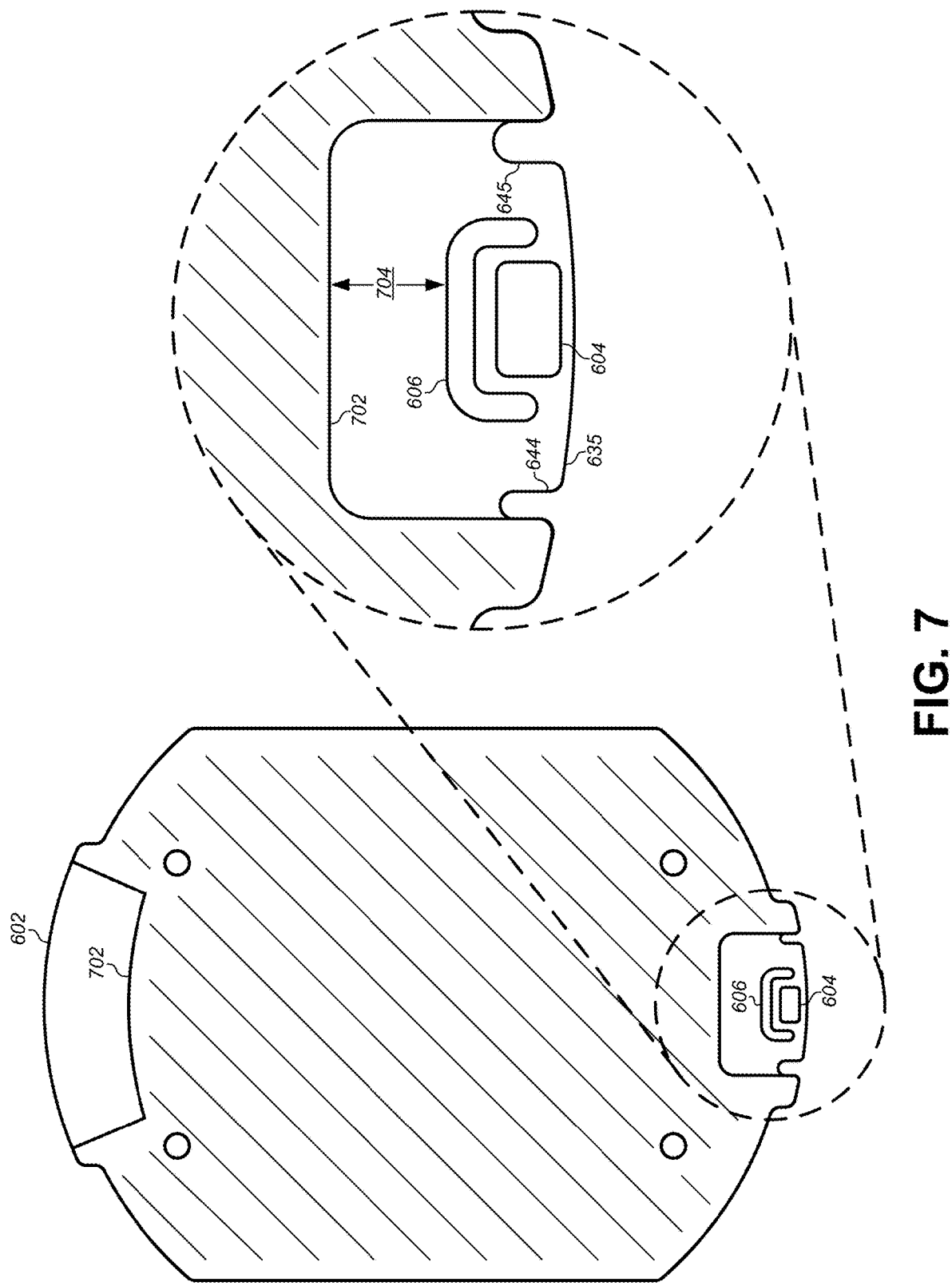
FIG. 7 illustrates how an environmental sensor can be isolated from a ground plane or other conductive plane in the PCB, according to some embodiments.

FIG. 7 illustrates how an environmental sensor 604 can be isolated from a ground plane 702 or other conductive plane in the PCB 602, according to some embodiments. FIG. 7 illustrates an internal layer of the PCB 602 that may be filled with a ground plane 702. The ground plane 702 may include a thin layer of conductive metal, such as copper. Various connections from components through pads on the outside surface of the PCB 602 may connect to the ground plane 702 using vias and other forms of inter-layer connections. The ground plane 702 may substantially cover a large portion of the area of the PCB 602 in order to provide stability and signal integrity for signals routed along other traces of the PCB 602. Note that other conductive planes may be present in the PCB 602, such as planes that isolate one component from another, planes that provide various references or power rail voltages, and so forth. Therefore, any principles in this disclosure that apply to the ground plane 702 may also be applied to other metal conductive planes in the PCB 602 without limitation. Any instance where a ground plane 702 is discussed may be freely substituted with any other plane that may be found in a PCB 602.

The ground plane 702 not only conducts electrical energy, but it also may be an efficient conductor of thermal energy. In contrast to the substrate of the PCB 602, the ground plane 702 may have a thermal conductivity of approximately 400 W/m-K when copper is used as a conductor. This may allow a significant amount of heat to travel through the ground plane 702 to heat areas of the PCB 602 that are around the environmental sensor 604. This may also allow heat to be conducted directly to the environmental sensor 604 through the ground plane 702 and the connecting pins of the IC package of the environmental sensor 604.

To solve this technical problem of conduction through the ground plane 702, some embodiments may be designed such that the ground plane 702 does not extend near or under the environmental sensor 604. In the example of FIG. 7, the ground plane 702 ends when it is approximately 10.0 mm away from the cut out 606 that surrounds the environmental sensor 604. For example, the distance from the cut out 606 represented by dimension 704 may be between approximately 5.0 mm and approximately 15.0 mm. The void created in the ground plane 702 around the cut out 606 and the environmental sensor 604 may leave a portion of the bottom edge 635 exposed as depicted in FIG. 7.

Figure 8B:
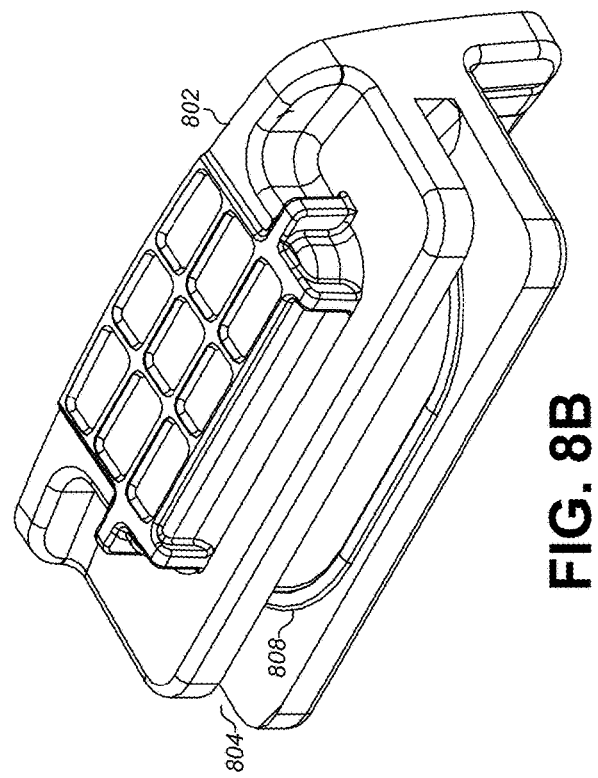
FIGS. 8A-8C illustrate various views of a gasket that may be placed around the environmental sensor, according to some embodiments.
Figure 8A:
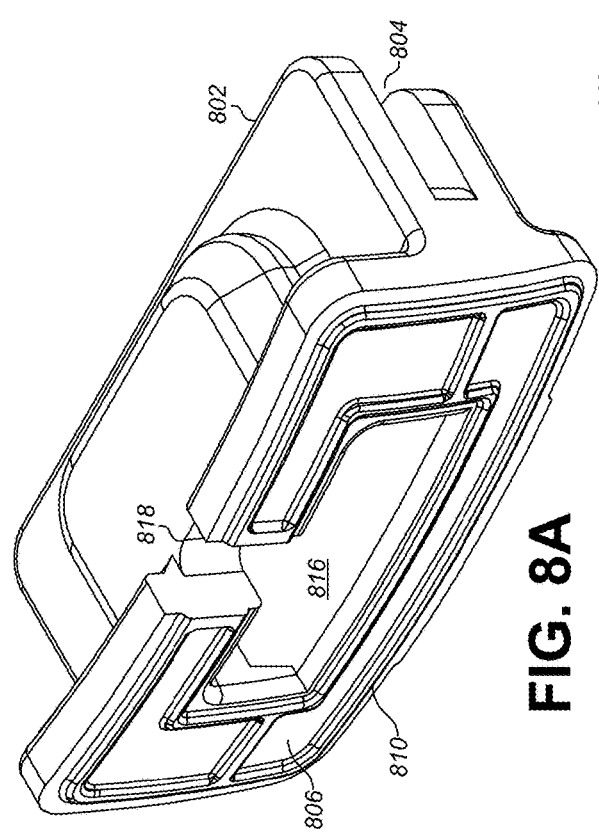
Figure 8C:
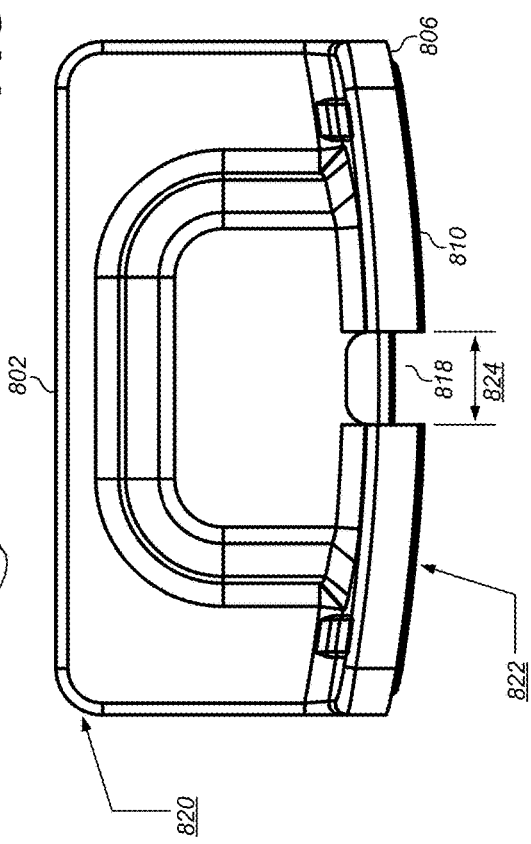
Figure 9A:
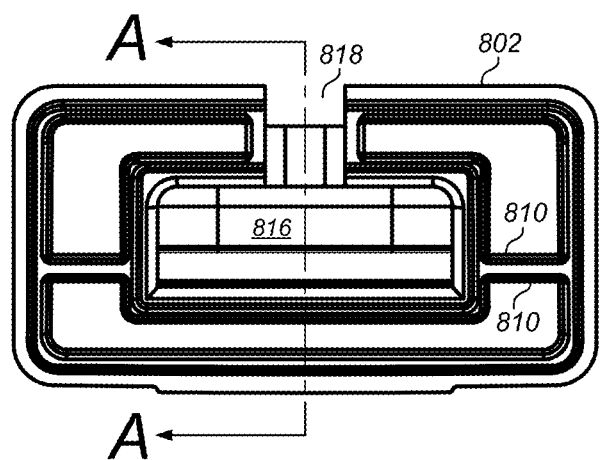
FIGS. 9A-9B illustrate a first cross-sectional view of the gasket, according to some embodiments.
Figure 9B:
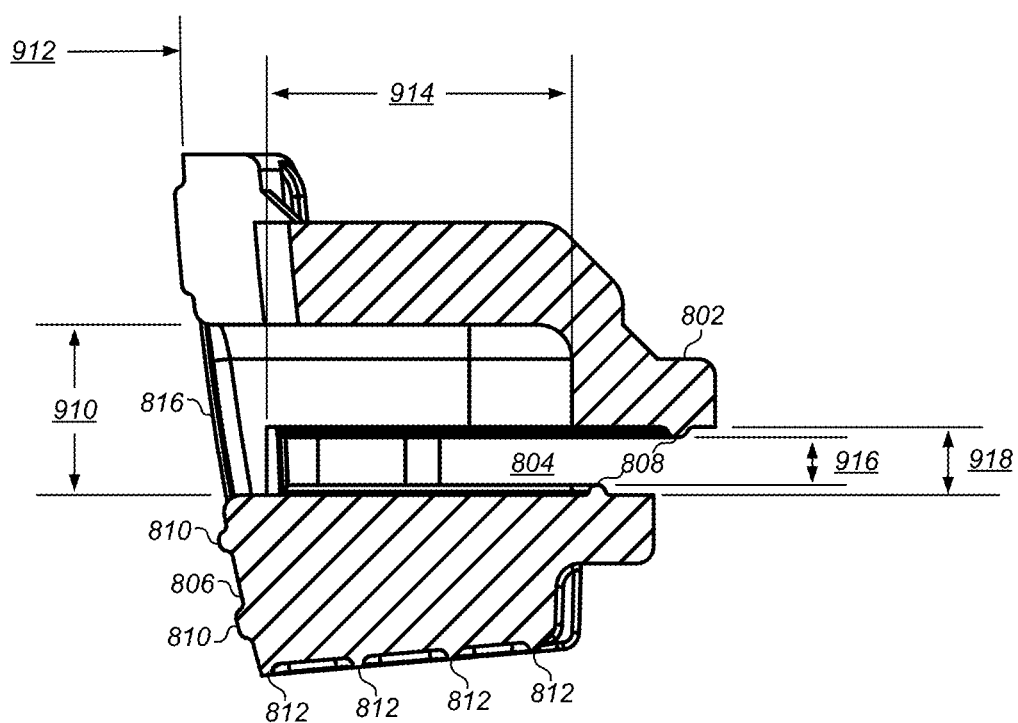
Figure 10A:
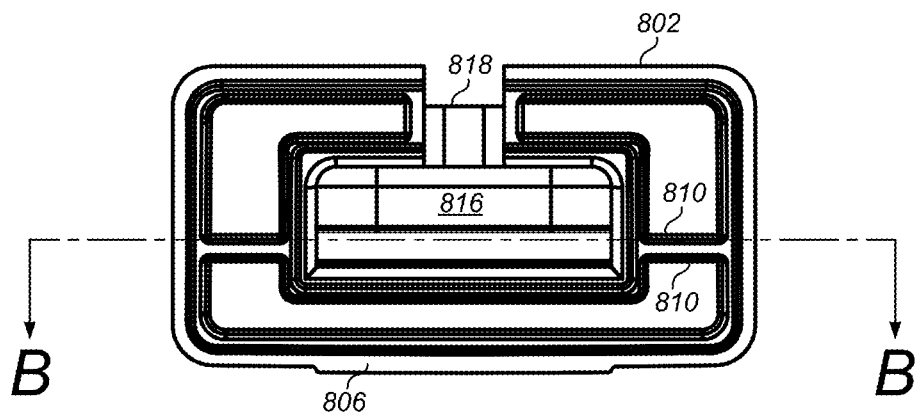
FIGS. 10A-10B illustrate a second cross-sectional view of the gasket, according to some embodiments.
Figure 10B:
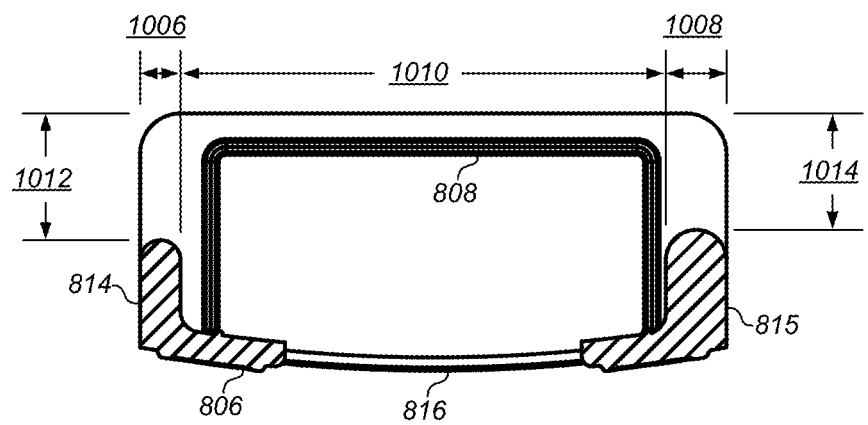

FIGS. 8A-8C illustrate various views of a gasket 802 that may be placed around the environmental sensor 604, according to some embodiments. FIGS. 9A-9B illustrate a first cross-sectional view of the gasket 802, according to some embodiments. FIGS. 10A-10B illustrate a second cross-sectional view of the gasket 802, according to some embodiments. In the discussion below, these figures may be referenced together to illustrate the various dimensions and features of the gasket 802. In addition to preventing conduction through the PCB 602 and/or ground plane 702, some embodiments may use a gasket 802 that forms a seal around the environmental sensor such that the environmental sensor is (1) isolated from the atmosphere inside of the housing, while (2) exposing the environmental sensor 604 to the atmosphere outside of the housing.

The gasket 802 may also prevent interference with the environmental sensor by physically isolating the environmental sensor 604 from an atmosphere inside of the smart-home device. Typical smart-home devices may include a housing that encloses the internal components of the smart-home device, including the PCB 602, batteries, processors, power circuitry, and so forth. The housing provides protection for these components and also provides a more pleasing look-and-feel for the smart-home device. However, the housing also typically serves to enclose air inside the smart-home device around the PCB 602. This disclosure may refer to the environmental conditions of the volume enclosed by the housing as an atmosphere inside of the housing. The atmosphere inside the housing typically will not flow freely between the inside of the housing and the outside of the housing, which may cause internal heating effects, internal humidity generation, internal noise, and/or other side effects of the energy-consuming components to be contained and possibly magnified substantially within the housing of the smart-home device. Therefore, when attempting to measure an environment immediately surrounding the environmental sensor 604, the environmental sensor 604 may typically be subject to all of the interfering sources that are trapped within the atmosphere inside of the housing. As described below, the gasket 802 serves to isolate the environmental sensor 604 from the rest of the atmosphere inside the housing and expose the environmental sensor 604 to the atmosphere outside of the housing.

The gasket 802 may be constructed from a flexible, compressible material that acts as a thermal insulator and prevents moisture/humidity diffusion through the material. In some embodiments, the gasket 802 may be constructed from a two-part silicon that is compression molded into the approximate shape illustrated in FIGS. 8A-8C. In selecting a material, the thermal insulation and moisture repellent properties typically found in harder, less compressible materials may be balanced with the need to form a tight seal between the gasket 802 and the PCB 202, as well as between the gasket 802 and a housing or other components of the smart-home device. Some additional materials that may be used for the gasket 802 may include low density polyethylene, polycarbonate, rubber-modified PVC, cellulose propionate, high-impact strength ABS, high-impact strength ethylcellulose, ethylcellulose, soft cellulose acetate, soft cellulose butyrate, rigid cellulose butyrate, cellulose acetate, Teflon®, glass fiber reinforced nylon, polyethylene, rigid cellulose acetate, nylon, acrylate, polyacetal, polypropylene, silicone, and/or other similar materials. In practice, a two-part silicon has been found to provide a good balance between thermal insulation, moisture repulsion, and compressibility for forming a tight seal.

The gasket 802 may include a slot 804 between an upper portion of the gasket 802 and a lower portion of the gasket 802. The slot 804 need not extend all the way through the gasket 802, but may end before a front surface 806 of the gasket 802 that seals with the housing. The size of the slot 804 may be greater than or equal to the size of the cut out 206 in the PCB 602. As shown in FIG. 10B, the overall width represented by dimension 1010 of the slot may be approximately between 10.0 mm and approximately 14.0 mm, with a value of approximately 12.0 mm in one embodiment. This allows the slot 804 to fit on or around the cutout 606 to create a seal against the PCB 602. Additionally, a thickness of the slot 804 may be equal to, or slightly smaller than the approximate thickness of the PCB 602. For example, as shown in FIG. 9B, a thickness of the slot 804 represented by dimension 918 may be between approximately 0.5 mm and approximately 1.5 mm, with a value of 1.0 mm in one embodiment. Additionally, an inside surface of the slot 804 may include raised ribs 808 on opposing sides of the slot 804. The raised ribs 808 may be compressed when the PCB 602 is inserted to form a seal around the environmental sensor 604 on the PCB 602. These raised ribs 808 may function similar to an O-ring. The distance between the raised ribs 808 represented by dimension 916 may be approximately 0.7 mm in one embodiment, which allows the raised ribs 808 to be raised between approximately 0.1 mm and 0.2 mm, with a value of 0.15 mm in one embodiment.

The front face 806 of the gasket 802 may also include raised ribs 810 that may be compressed against the housing of the smart-home device in order to form a seal against the housing. A bottom side of the gasket 802 may also include additional raised ribs 812 that further seal the gasket 802 to the housing during and after assembly. FIG. 9B illustrates a side cross-sectional view of the gasket 802 to be installed in the housing with the raised ribs 810, 812 that may be compressed against the housing after installation. Note that the pattern of the raised ribs 810 on the front face 806 of the gasket 802 may be arranged such that they divide the front face 806 into a plurality of different regions. This may be done to isolate any defects in the seal against the housing to a smaller portion of the surface area of the front face 806. For example, if a portion of the raised ribs 810 fails, only a portion of the seal will fail while the other subdivided areas of the front face 806 remain properly sealed.

In order to mate with the PCB 602, the gasket 802 may also include one or more tabs 814, 815 that may be mated with corresponding slots 644, 645 on the PCB 602. The tabs 814, 815 are best illustrated in the cross-sectional view of FIG. 10B. In some embodiments, the tabs 814, 815 may have different widths such that they can be mounted into corresponding tabs 644, 645 on the PCB 602 of different widths. For example, a first tab 814 may have a width defined by dimension 1006 to be between approximately 0.5 mm and 1.5 mm, with a value of approximately 1.0 mm in one embodiment. A second tab 815 may have a width defined by dimension 1008 to be between approximately 1.0 mm and 2.0 mm, with a value of approximately 1.5 mm in one embodiment. The widths of the tabs 814, 815 may be configured to be sufficient that when pressed into the corresponding slots 644, 645 a compression fit is achieved to secure the gasket 802 to the PCB 602. For example, turning back to FIG. 6, a first slot 644 may have a width represented by dimension 620 to be between approximately 0.5 mm and 1.5 mm, with a value of approximately 1.0 mm in one embodiment. A second slot 645 may have a width represented by dimension 622 to be between approximately 1.0 mm and 2.0 mm, with a value of approximately 1.5 mm in one embodiment. The widths of the slots 644, 645 within these ranges may be configured to be approximately equal or slightly smaller (e.g., 0.1 mm smaller) than the widths of the corresponding tabs 614, 615. The overall width between the tabs (inclusive) represented by dimension 612 may be between approximately 10.0 mm and 20.0 mm, with a value of a proximally 14.5 mm in one embodiment. This dimension 612 may represent the overall width of the gasket 802.

Figure 11:
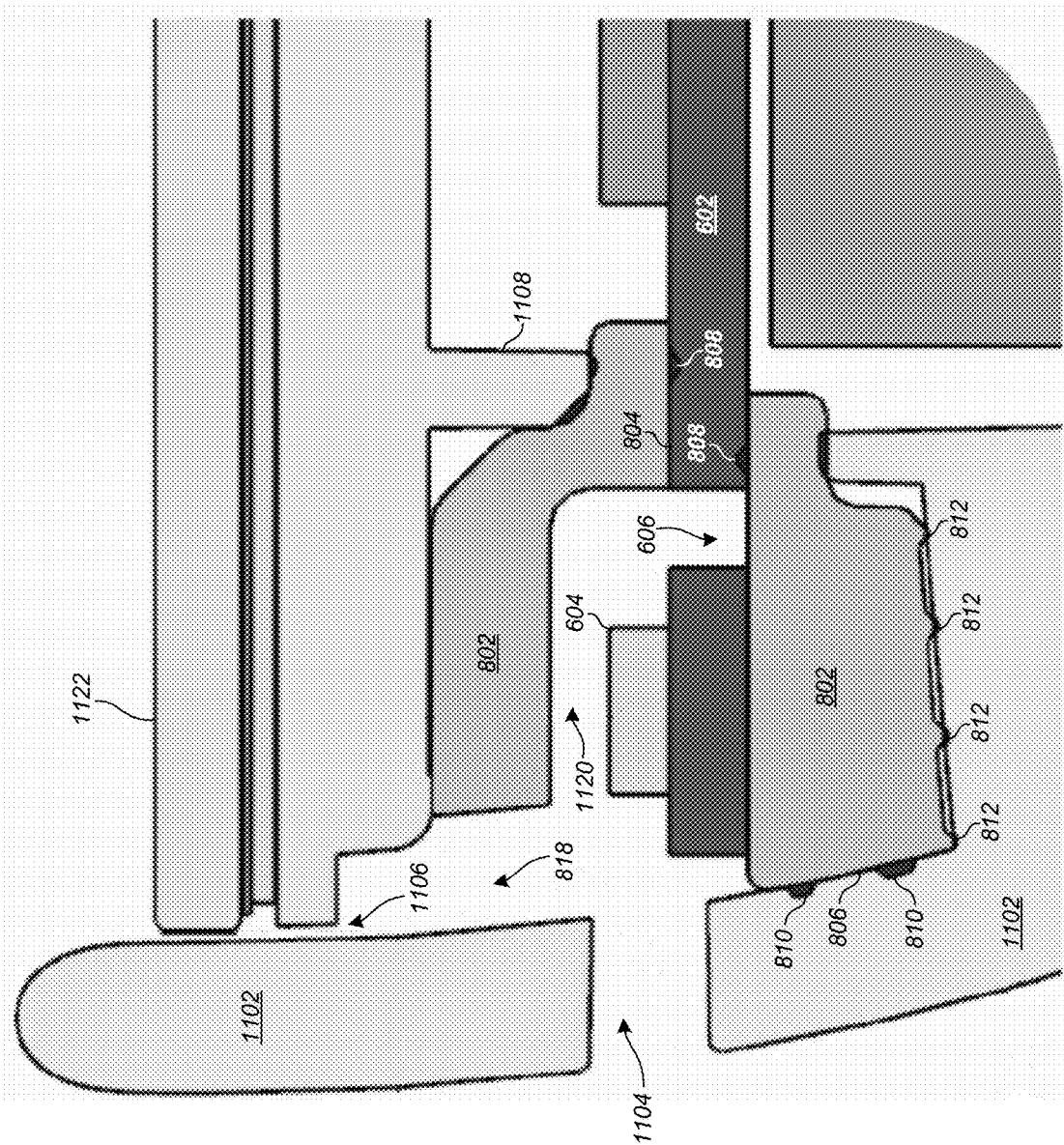
FIG. 11 illustrates a cross-sectional view of the gasket installed in a housing of the smart-home device, according to some embodiments.

The gasket 802 may also include an opening 816 in the front face 806 of the gasket 802. The opening may be integrated with a slot 818 that provides a break in the seal of the front face 806 against the housing of the smart-home device. FIG. 11 illustrates a cross-sectional view of the gasket 802 installed in a housing 1102 of the smart-home device, according to some embodiments. The housing 1102 may include a hole 1104 that is positioned in front of the opening 816 of the gasket 802. The raised ribs 810 of the front face 806 may compress against the housing 1102 to create a seal around the hole 1104. During installation, the PCB 602 may first be inserted into the slot 804 of the gasket 802 such that the gasket 802 encloses the environmental sensor 604 on the PCB 602 and seals against the PCB 602. As illustrated in FIG. 11, the cut out 606 may also be flush with an interior cavity 1120 formed around the cut out 606 and the environmental sensor 604.

The hole 1104 in the housing 1102 and the opening 816 in the gasket 802 may provide a first pathway for the atmosphere outside of the smart-home device to enter the cavity 1120 such that the atmosphere outside of the smart-home device can be measured by the environmental sensor 604. To prevent the atmosphere in the cavity 1120 from growing stale, and to encourage airflow through the cavity 1120, the gap 818 in the gasket 802 may also provide a second pathway for the atmosphere outside of the smart-home device to enter/exit the cavity 1120. By way of example, the housing 1102 may leave a small gap 1106 between the housing 1102 and a front cover 1122 of the smart-home device. Air may flow in through the hole 1104 and out through the gap 1106 or vice versa. In some embodiments, the gap 1106 may extend around a circumference of the front cover 1122 of the thermostat. This may allow the atmosphere inside of the smart-home device to somewhat vent to the outside atmosphere. In other embodiments, the gap 1106 may be limited such that the gap 1106 exists only in front of the gap 818 in the gasket 802. This may allow the atmosphere inside of the smart-home device to be isolated from the atmosphere outside of the smart-home device, thereby preventing the ready exchange of airflow through thermal convection with the outside atmosphere. In some embodiments, the gap 1106 may be small enough that temperature and/or airflow does not readily move through the gap 1106, while humidity is allowed to dissipate through the gap 1106.

Note that when the cover 1122 and/or structure 1108 attached with the front cover 1122 are assembled, the cover 1122 and structure 1108 may further compress portions of the gasket 802 to ensure that a tight seal is formed between the atmosphere inside the smart-home device and the atmosphere outside of the smart-home device. Also note that the gap 818 in the seal on the front face of the gasket 802 may allow air to flow through the hole 1104 and the gap 1106 in the housing without exposing that airflow to the internal atmosphere of the smart-home device.

Figure 12:
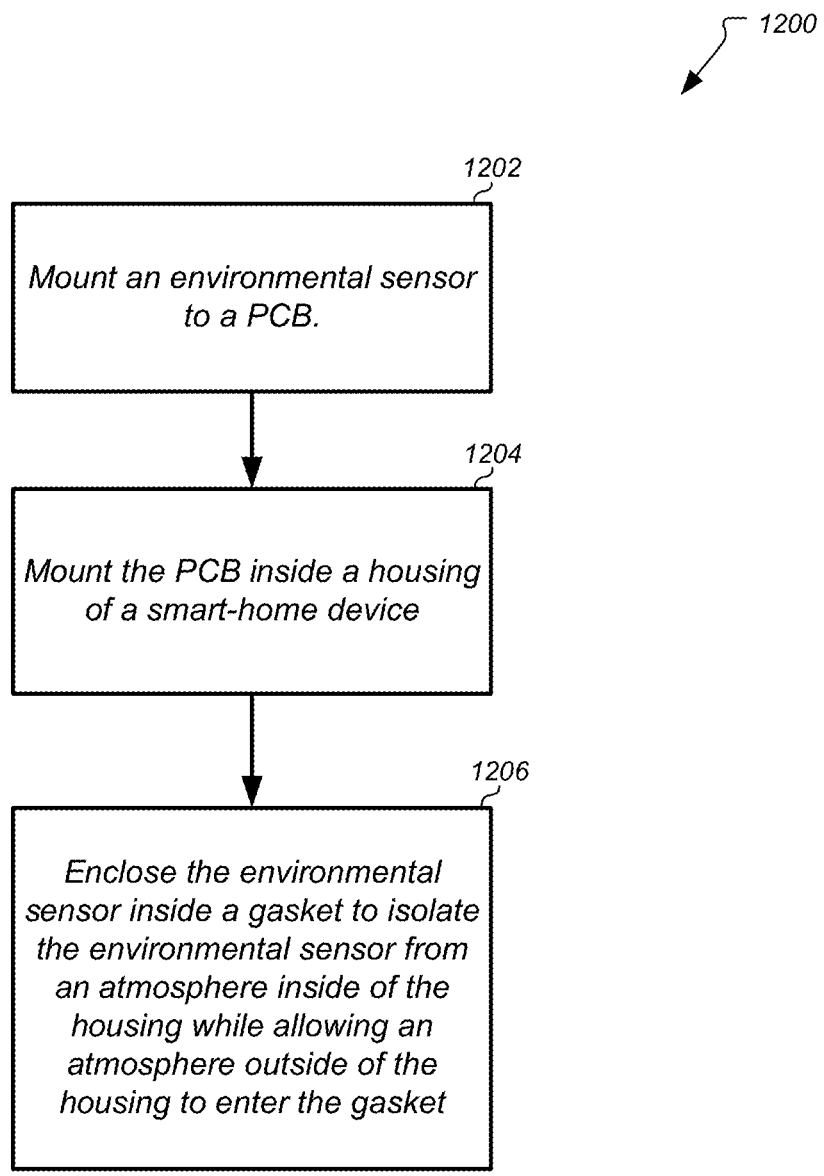
FIG. 12 illustrates a flowchart of a method for isolating environmental sensors from internal atmospheres of smart-home devices.

FIG. 12 illustrates a flowchart 1200 of a method for isolating environmental sensors from internal atmospheres of smart-home devices. The method may include mounting an environmental sensor to a printed circuit PCB (1202). The environmental sensor may be mounted by soldering an integrated circuit package to pads on the PCB. The PCB may include a cutout that substantially surrounds one, two, or three sides of the environmental sensor. A ground plane of the PCB may also be configured such that it does not run underneath or within a threshold distance of the environmental sensor.

The method may also include mounting the PCB inside a housing of the smart-home device (1204), and enclosing the environmental sensor inside a gasket to isolate the environmental sensor from an atmosphere inside of the housing while allowing an atmosphere outside of the housing to enter the gasket (1206). The gasket may be configured as illustrated and described above in relation to FIGS. 8A-11 of this disclosure. The combination of the PCB and the gasket may allow the environmental sensor to measure an aspect of the atmosphere, such as temperature, outside of the housing without substantial interference from the atmosphere inside of the housing.

It should be appreciated that the specific steps illustrated in FIG. 12 provide particular methods of isolating environmental sensors from internal atmospheres of smart-home devices according to various embodiments. Other sequences of steps may also be performed according to alternative embodiments. For example, alternative embodiments may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. Many variations, modifications, and alternatives also fall within the scope of this disclosure.

The Smart-Home Environment

Figure 13:
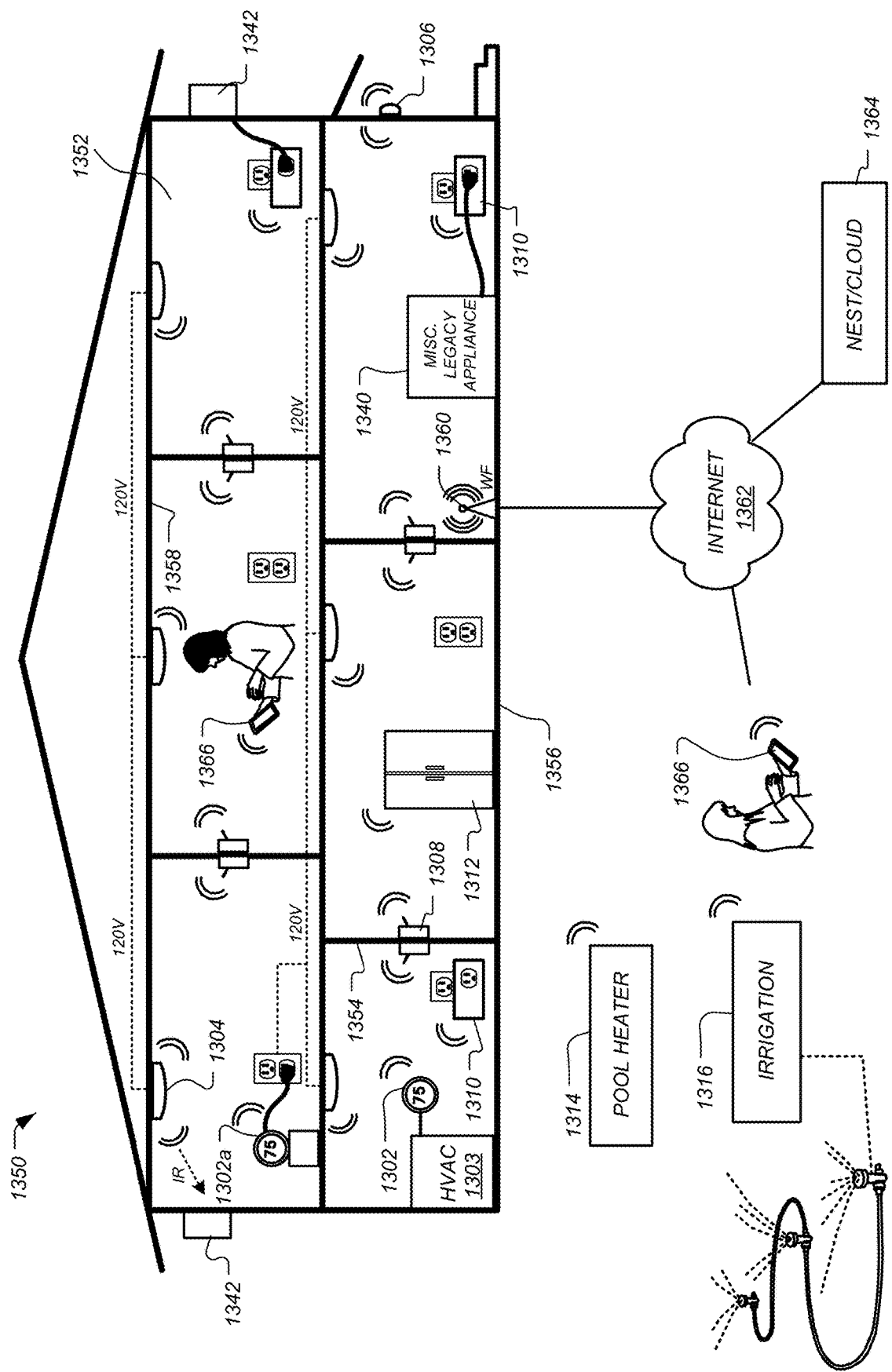
FIG. 13 illustrates an example of a smart home environment within which one or more of the devices, methods, systems, services, and/or computer program products described further herein can be applicable.

FIG. 13 illustrates an example of a smart home environment within which one or more of the devices, methods, systems, services, and/or computer program products described further herein can be applicable. The depicted smart home environment includes a structure 1350, which can include, e.g., a house, office building, garage, or mobile home. It will be appreciated that devices can also be integrated into a smart home environment that does not include an entire structure 1350, such as an apartment, condominium, or office space. Further, the smart home environment can control and/or be coupled to devices outside of the actual structure 1350. Indeed, several devices in the smart home environment need not physically be within the structure 1350 at all. For example, a device controlling a pool heater or irrigation system can be located outside of the structure 1350.

The depicted structure 1350 includes a plurality of rooms 1352, separated at least partly from each other via walls 1354. The walls 1354 can include interior walls or exterior walls. Each room can further include a floor 1356 and a ceiling 1358. Devices can be mounted on, integrated with and/or supported by a wall 1354, floor or ceiling.

The smart home depicted in FIG. 13 includes a plurality of devices, including intelligent, multi-sensing, network-connected devices that can integrate seamlessly with each other and/or with cloud-based server systems to provide any of a variety of useful smart home objectives. One, more or each of the devices illustrated in the smart home environment and/or in the figure can include one or more sensors, a user interface, a power supply, a communications component, a modularity unit and intelligent software as described herein. Examples of devices are shown in FIG. 13.

An intelligent, multi-sensing, network-connected thermostat 1302 can detect ambient climate characteristics (e.g., temperature and/or humidity) and control a heating, ventilation and air-conditioning (HVAC) system 1303. One or more intelligent, network-connected, multi-sensing hazard detection units 1304 can detect the presence of a hazardous substance and/or a hazardous condition in the home environment (e.g., smoke, fire, or carbon monoxide). One or more intelligent, multi-sensing, network-connected entryway interface devices 1306, which can be termed a "smart doorbell", can detect a person's approach to or departure from a location, control audible functionality, announce a person's approach or departure via audio or visual means, or control settings on a security system (e.g., to activate or deactivate the security system).

Each of a plurality of intelligent, multi-sensing, network-connected wall light switches 1308 can detect ambient lighting conditions, detect room-occupancy states and control a power and/or dim state of one or more lights. In some instances, light switches 1308 can further or alternatively control a power state or speed of a fan, such as a ceiling fan. Each of a plurality of intelligent, multi-sensing, network-connected wall plug interfaces 1310 can detect occupancy of a room or enclosure and control supply of power to one or more wall plugs (e.g., such that power is not supplied to the plug if nobody is at home). The smart home may further include a plurality of intelligent, multi-sensing, network-connected appliances 1312, such as refrigerators, stoves and/or ovens, televisions, washers, dryers, lights (inside and/or outside the structure 1350), stereos, intercom systems, garage-door openers, floor fans, ceiling fans, whole-house fans, wall air conditioners, pool heaters 1314, irrigation systems 1316, security systems (including security system components such as cameras, motion detectors and window/door sensors), and so forth. While descriptions of FIG. 13 can identify specific sensors and functionalities associated with specific devices, it will be appreciated that any of a variety of sensors and functionalities (such as those described throughout the specification) can be integrated into the device.

In addition to containing processing and sensing capabilities, each of the devices 1302, 1304, 1306, 1308, 1310, 1312, 1314 and 1316 can be capable of data communications and information sharing with any other of the devices 1302, 1304, 1306, 1308, 1310, 1312, 1314 and 1316, as well as to any cloud server or any other device that is network-connected anywhere in the world. The devices can send and receive communications via any of a variety of custom or standard wireless protocols (Wi-Fi, ZigBee, 6LoWPAN, Thread, Bluetooth, BLE, HomeKit Accessory Protocol (HAP), Weave, etc.) and/or any of a variety of custom or standard wired protocols (CAT6 Ethernet, HomePlug, etc.). Each of the devices 1302, 1304, 1306, 1308, 1310, 1312, 1314 and 1316 may also be capable of receiving voice commands or other voice-based inputs from a user, such as the Google Home® interface. The wall plug interfaces 1310 can serve as wireless or wired repeaters, and/or can function as bridges between (i) devices plugged into AC outlets and communicating using Homeplug or other power line protocol, and (ii) devices that not plugged into AC outlets.

For example, a first device can communicate with a second device via a wireless router 1360. A device can further communicate with remote devices via a connection to a network, such as the Internet 1362. Through the Internet 1362, the device can communicate with a central server or a cloud-computing system 1364. The central server or cloud-computing system 1364 can be associated with a manufacturer, support entity or service provider associated with the device. For one embodiment, a user may be able to contact customer support using a device itself rather than needing to use other communication means such as a telephone or Internet-connected computer. Further, software updates can be automatically sent from the central server or cloud-computing system 1364 to devices (e.g., when available, when purchased, or at routine intervals).

By virtue of network connectivity, one or more of the smart-home devices of FIG. 13 can further allow a user to interact with the device even if the user is not proximate to the device. For example, a user can communicate with a device using a computer (e.g., a desktop computer, laptop computer, or tablet) or other portable electronic device (e.g., a smartphone). A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

The smart home also can include a variety of non-communicating legacy appliances 1340, such as old conventional washer/dryers, refrigerators, and the like which can be controlled, albeit coarsely (ON/OFF), by virtue of the wall plug interfaces 1310. The smart home can further include a variety of partially communicating legacy appliances 1342, such as IR-controlled wall air conditioners or other IR-controlled devices, which can be controlled by IR signals provided by the hazard detection units 1304 or the light switches 1308.

In the foregoing description, the term "approximately" may be interpreted to mean within 10% of a stated value. For example, approximately 10.0 mm may be interpreted as a range of between 9.0 mm and 11.0 mm. The term "substantially" may be interpreted to mean at least approximately 90% of a value. For example, substantially filling an area may be interpreted as filling approximately 90% of an area.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A smart-home device comprising:
a housing;
a printed circuit board (PCB) inside the housing;
an environmental sensor mounted along an edge of the PCB inside the housing; and
a gasket that encloses the environmental sensor inside the housing and encloses a portion of the PCB inside the housing to isolate the environmental sensor from an atmosphere inside of the housing while allowing an atmosphere outside of the housing to enter the gasket such that the environmental sensor can measure an aspect of the atmosphere outside of the housing, wherein the gasket comprises a slot configured to receive the edge of the PCB such that the gasket wraps around the edge of the PCB to enclose the environmental sensor and the portion of the PCB.

2. The smart-home device of claim 1, wherein the environmental sensor is mounted approximately along a bottom edge of the PCB.

3. The smart-home device of claim 1, wherein:
the environmental sensor is mounted to a first side of the PCB; and
the gasket further isolates a portion of a second side of the PCB that is opposite of a location where the environmental sensor is mounted to the first side of the PCB.

4. The smart-home device of claim 1, wherein the housing comprises a first hole surrounded by the gasket providing access to the atmosphere outside of the housing.

5. The smart-home device of claim 4, wherein the gasket comprises a second hole such that the atmosphere outside of the housing can flow between the first hole and the second hole.

6. The smart-home device of claim 1, wherein the PCB comprises a cutout that surrounds at least three sides of the environmental sensor.

7. The smart-home device of claim 1, wherein the PCB comprises a ground plane that does not run beneath the environmental sensor.

8. The smart-home device of claim 1, wherein the PCB comprises a plurality of heat-generating components that heat the atmosphere inside of the housing when the plurality of heat-generating components operate.

9. The smart-home device of claim 1, wherein the PCB comprises one or more slots configured to receive one or more tabs of the gasket to align the gasket relative to the environmental sensor on the PCB.

10. The smart-home device of claim 1, wherein the smart-home device comprises a thermostat.

11. The smart-home device of claim 1, wherein the smart-home device comprises a digital home assistant.

12. The smart-home device of claim 1, wherein the environmental sensor comprises a temperature sensor, and wherein there are no additional temperature sensors in the smart-home device aside from the temperature sensor.

13. The smart-home device of claim 1, wherein the environmental sensor comprises a humidity sensor.

14. A method of isolating environmental sensors from internal atmospheres of smart-home devices, the method comprising:
mounting an environmental sensor along an edge of a printed circuit board (PCB);
mounting the PCB inside a housing of a smart-home device; and
enclosing the environmental sensor and a portion of the PCB inside a gasket to isolate the environmental sensor from an atmosphere inside of the housing while allowing an atmosphere outside of the housing to enter the gasket such that the environmental sensor can measure an aspect of the atmosphere outside of the housing, wherein the gasket comprises a slot configured to receive the edge of the PCB such that the gasket wraps around the edge of the PCB to enclose the environmental sensor and the portion of the PCB.

15. The method of claim 14, further comprising mounting the environmental sensor approximately along a bottom edge of the PCB.

16. The method of claim 14, wherein the gasket comprises a slot configured to receive a bottom edge of the PCB such that the gasket wraps around the bottom edge of the PCB.

17. The method of claim 14, wherein:
the housing comprises a first hole surrounded by the gasket providing access to the atmosphere outside of the housing; and
the gasket comprises a second hole such that the atmosphere outside of the housing can flow between the first hole and the second hole.

18. The method of claim 14, wherein the PCB comprises a cutout that surrounds at least three sides of the environmental sensor.

19. The method of claim 14, wherein the PCB comprises a ground plane that does not run beneath the environmental sensor.

* * * * *